(12) United States Patent
Youssef et al.

(10) Patent No.: US 10,899,903 B2
(45) Date of Patent: Jan. 26, 2021

(54) SCALABLE MANUFACTURING METHOD OF PROPERTY-TAILORABLE POLYUREA FOAM

(71) Applicant: SAN DIEGO STATE UNIVERSITY RESEARCH FOUNDATION, San Diego, CA (US)

(72) Inventors: George Youssef, San Diego, CA (US); Nathan Reed, San Diego, CA (US)

(73) Assignee: San Diego State University Research Foundation, San Diego, CA (US)

(*) Notice: Subject to any disclaimer, the term of this patent is extended or adjusted under 35 U.S.C. 154(b) by 185 days.

(21) Appl. No.: 16/118,879

(22) Filed: Aug. 31, 2018

(65) Prior Publication Data

US 2020/0071483 A1    Mar. 5, 2020

(51) Int. Cl.
| | | |
|---|---|---|
| *B29C 44/02* | (2006.01) | |
| *B29C 44/40* | (2006.01) | |
| *C08G 18/32* | (2006.01) | |
| *C08G 18/50* | (2006.01) | |
| *C08G 18/79* | (2006.01) | |
| *C08G 18/80* | (2006.01) | |
| *C08J 9/12* | (2006.01) | |
| *B29K 75/00* | (2006.01) | |

(52) U.S. Cl.
CPC .............. *C08J 9/125* (2013.01); *B29C 44/02* (2013.01); *C08G 18/324* (2013.01); *C08G 18/3228* (2013.01); *C08G 18/8003* (2013.01); *B29K 2075/02* (2013.01); *C08J 2203/10* (2013.01); *C08J 2205/044* (2013.01); *C08J 2205/048* (2013.01); *C08J 2205/052* (2013.01); *C08J 2205/10* (2013.01); *C08J 2375/02* (2013.01)

(58) Field of Classification Search
CPC .... B29K 2075/02; C08J 9/125; C08J 2375/02
See application file for complete search history.

(56) References Cited

U.S. PATENT DOCUMENTS

| | | | | |
|---|---|---|---|---|
| 4,334,944 A | * | 6/1982 | Creyf ...................... | C08G 18/14 156/308.2 |
| 5,155,142 A | * | 10/1992 | Lidy ..................... | C08G 18/089 521/157 |
| 5,189,073 A | * | 2/1993 | Humbert ............ | C08G 18/0895 521/110 |
| 5,700,846 A | * | 12/1997 | Grigsby, Jr. ........... | C08G 18/10 521/128 |
| 6,020,392 A | * | 2/2000 | Kushner ................ | C08G 18/10 521/130 |
| 7,533,557 B1 | * | 5/2009 | Mott ...................... | G01N 3/303 73/12.14 |
| 2012/0235070 A1 | * | 9/2012 | Fricke ................ | C08G 18/3819 252/62 |
| 2016/0229976 A1 | * | 8/2016 | Fricke ....................... | E04B 1/80 |
| 2019/0111658 A1 | * | 4/2019 | Gupta ....................... | B32B 5/18 |

FOREIGN PATENT DOCUMENTS

EP            93392 A1 *  9/1983

* cited by examiner

*Primary Examiner* — Melissa A Rioja
(74) *Attorney, Agent, or Firm* — Juneau & Mitchell IP Law Firm; Todd L. Juneau

(57) ABSTRACT

The scope of this invention is to disclose the method of foaming a superior impact mitigation material, namely semi-closed cell hybrid polyurea foam, using scalable manufacturing process that is geometry-independent and allows for greater control of the resulting foam properties. while the process discussed herein, can be easily used to make complex geometries (e.g., padding foam for helmets, outsoles for walking and running shoes, body armors or other protection applications.

11 Claims, 20 Drawing Sheets

| | Max Strain (mm/mm) | Max Stress (MPa) | Young's Modulus (MPa) | Max Efficiency | Toughness (MPa) | Density (kg/m³) | Specific Strength | Specific Toughness | Specific Modulus |
|---|---|---|---|---|---|---|---|---|---|
| Leading Brand (LB) | 0.63 | 0.72 | 0.69 | 0.20 | 136142.94 | 391.41 | 0.0018 | 347.83 | 0.00177 |
| Polyurea Foam (PU) | 0.68 | 0.58 | 0.50 | 0.24 | 87557.06 | 219.09 | 0.0027 | 399.69 | 0.00228 |
| PU/LB | 109% | 81% | 72% | 119% | 64% | 56% | 144% | 115% | 129% |

SEM micrographs of (a-c) low relative density (EML227) and (d-f) high relative density (EML350) polyurea foam showing cell perforation and deposits of microspheres Perforation formation process in (a) EML227 and (b) EML350 polyurea foams (insets capture the stretch marks due to cell expansion during the foaming process)

Self-reinforcement of foam by self-assembled polyurea microspheres on (a) EML227 and (b) EML350 internal cell walls Scanning Electron Microscopy scans of (a) EML227, (b) EML350 and (c) benchmark foam samples (arrows represent draining direction of $diH_2O$).

SEM micrographs of 0.21 relative density polyurea foam showing the hierarchical microstructure.

Comparison of the efficiency and G-level between novel polyurea foam and closed-cell benchmark foam.

SCALABLE MANUFACTURING METHOD OF PROPERTY-TAILORABLE POLYUREA FOAM

BACKGROUND

Foams have been integrated in numerous impact mitigation mechanisms such as protective pads, football helmets, walking and running shoes, and biking helmets; to name a few. However, the functionalities of polymer-based foams are well understood for impact mitigation, the underlying polymer's mechanical and physical properties as well as its ability to be foamed plays the bigger role in the effectiveness of the foam. Basically, in order of polymer-based foam to be effective in mitigating impact, the foam layer must be able to reduce the amplitude of the impact load while increasing the duration of the impact. In other words, the foam reduced the severity of the impact by reducing the transmitted energy through energy absorbing mechanisms that include elastic and plastic deformation of the foam materials.

Polyurea has been heavily investigated in the past decade and was found to be very effective in mitigating impact in different applications (i.e., civilian and military) when used in a bulk form. Existing methods are cumbersome, expensive, and not-scalable for processing to foam polyurea.

The ability to manufacture polyurea foam is inherently impeded due to the viscosity of the polyurea mixture as well as the short pot life. It is also hindered by the excellent adhesion properties of polyurea, which make the materials selection for the tooling and handling very challenging. In previous attempts, vacuum oven was used to foam the mixture but this process does not easily allow to control the thickness and density of the foam. Additionally, the usage of vacuum oven limits the geometry of the foam. In other words, vacuum oven process can be used to make sheets with poor surface flatness with approximate thickness and density, Therefore, there is a need for materials with inherent superior impact mitigation properties that can outperform others.

SUMMARY

The scope of this invention is to disclose the method of foaming a superior impact mitigation material, namely polyurea, using scalable manufacturing process that is geometry-independent and allows for greater control of the resulting foam properties. while the process discussed herein, can be easily used to make complex geometries (e.g., padding foam for helmets, outsoles for walking and running shoes, body armors or other protection applications apparent to those skilled in the field).

Accordingly, to address these and other issues in the prior art, there is provided in a non-limiting preferred embodiment of the invention, a process of making a hybrid polyurea foam having a semi-closed cell microstructure, comprising the steps: STEP 1: Removing crystallization in a 1-part sample of methylene diphenyl diisocyanate (Isonate) by heating the Isonate to about 98 degrees Fahrenheit, holding at that temperature for about 45 minutes, then immediately stirring vigorously for 2 minutes, and allowing Isonate to return to room temperature; STEP 2: Pre-Mixing a 13.3 part sample of deionized water and a 4-part sample of polytetramethyleneoxide-di-p-aminobenzoate (Versalink) in a mixing container for about 45 seconds at about 10,000 rpm, wherein the ratio of Versalink to Isonate is 4:1 by mass, and the ratio of the combination of Versalink and Isonate to Deionized water is 8:3 by mass; STEP 3: With the mixer turned off and suspended above the mixing container, add the Isonate to the mixing container, then mix the solution of deionized water-Versalink-Isonate for 45 seconds at roughly 10,000 RPM, moving the mixer around the mixing container during mixing; and, STEP 4: Let the solution sit for 45 seconds after mixing, allowing time for the reaction to occur, and then, after draining excess water from the mixing container, pour the mixture into a mold.

In another preferred embodiment, there is provided a hybrid polyurea foam made according to the process of claim 1, wherein the hybrid polyurea foam comprises: (i) a plurality of large semi-closed cells having a n average diameter of 370+/−162 µm, surrounded by (ii) a plurality of small semi-closed cells having an average diameter of 69+/−162 µm.

In another preferred embodiment, there is provided wherein the hybrid polyurea foam is configured in a complex geometry or shape selected from the group consisting of: padding foam for helmets, outsoles for walking shoes, outsoles for running shoes, and padding foam for body armor.

In another preferred embodiment, there is provided a method of preparing a polyurea component in a pre-treated non-stick mold, comprising the steps in order: STEP 1: Measure out the necessary amounts of the following ingredients: (a) Versalink P-1000 (polytetramethyleneoxide-di-p-aminobenzoate); (b) Isonate 143L (methylene diphenyl diisocyanate)—(b)(i) The ratio of Versalink to Isonate must be 4:1 by mass; (c) Deionized Water—(c)(i) The ratio of the combination of Versalink and Isonate to Deionized water must be 8:3 by mass; (d) To produce a foam sample with a thickness of 0.75 in, use the following masses: Versalink: 429.9 g, Isonate: 107.5 g, Deionized Water: 1,433.0 g; STEP 2: Heat Isonate to 98 degrees Fahrenheit. Hold at this temperature for 45 minutes, then immediately stir vigorously for 2 minutes. Allow Isonate to return to room temperature. (a) This is done to break up any crystallization in the Isonate; STEP 3: Pre-Mixing (Deionized water and Versalink): (a) Add the deionized water and then the Versalink to a mixing container, (b) Use the SCILOGEX D500 Homogenizer to mix the solution for 45 seconds at a Low setting, roughly 10,000 RPM, moving the mixer around the mixing container during mixing; STEP 4: Mixing (Deionized water, Versalink, and Isonate): (a) With the mixer turned off and suspended above the mixing container, add the isonate to the mixing container, (b) Use the SCILOGEX D500 Homogenizer to mix the solution for 45 seconds on a low setting, roughly 10,000 RPM, moving the mixer around the mixing container during mixing; STEP 5: Waiting period: (a) Let the solution sit for 45 seconds after mixing. This allows time for the reaction to occur; STEP 6: Immediately after the waiting period, drain excess water from the bottom of the mixing container; STEP 7: Pour mixture into the mold, as evenly as possible; STEP 8: drain excess water by tilting the mold in multiple directions; STEP 9: place the mold lid into the mold, and attach bar clamps (1 per side, 4 total) to limit the expansion of the foam and inhibit the lid from rising or becoming uneven; and STEP 10: Leave sample in mold for 24 hours, after 24 hours, remove the mold from the polyurea foam component.

In another preferred embodiment, there is provided a polyurea component prepared according to the process claimed herein, wherein the polyurea component is configured in a complex geometry or shape selected from the group consisting of: padding foam for helmets, outsoles for walking shoes, outsoles for running shoes, and padding foam for body armor.

In another preferred embodiment, there is provided a mold for preparing polyurea foam component, comprising: a planar top cover attached by fasteners and stop-mechanism plates to a four-walled enclosure, the four-walled enclosure having a bottom plate attached thereto by additional fasteners, the planar top cover raised above a top surface of the four-walled enclosure by one or more spacers placed at the top surface of each wall of the four-walled enclosure, one wall of the four-walled enclosure having an aperture on a bottom surface configured to allow pouring access into the four-walled enclosure, a metal mesh component is disposed within the aperture.

BRIEF DESCRIPTION OF THE DRAWINGS

FIGS. 17 (a)-(i) show that the inventive polyurea foam is hierarchical because the large foam cells are surrounded with smaller cells embedded in the walls around each cell.

FIG. 18 is a table comparing various features of the inventive polyurea foam (PU) versus a leading brand (LB).

DETAILED DESCRIPTION OF THE INVENTION

Figure 1:
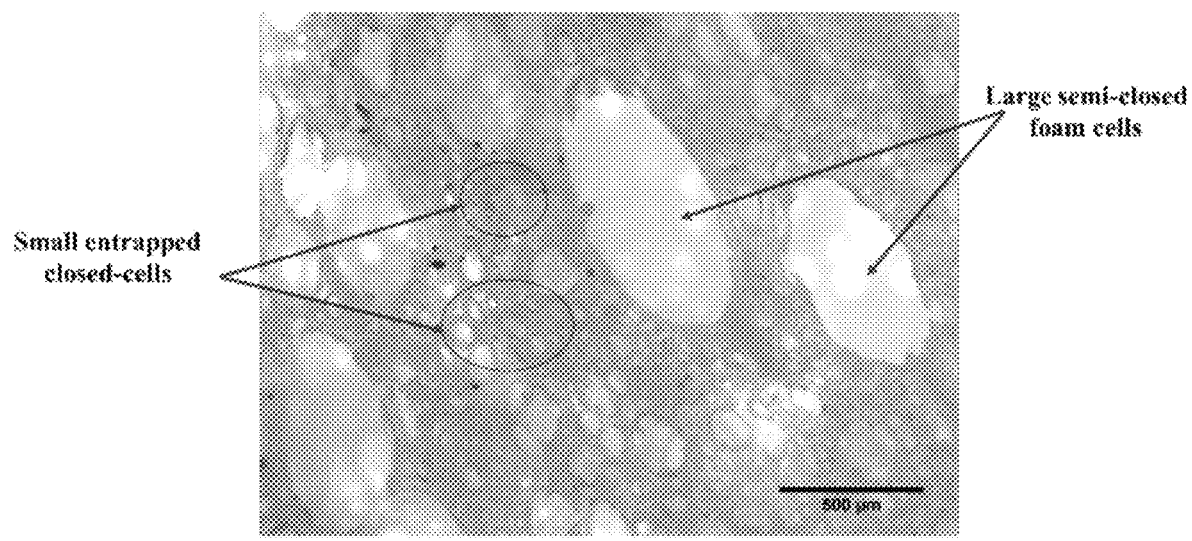
FIG. 1 is an optical micrograph showing the entrapment of small closed-cells in the wall of large semi-closed cell and shows that the inventive polyurea foam is hierarchical because the large foam cells are surrounded with smaller cells embedded in the walls around each cell.

This invention discloses two new innovations in manufacturing polyurea foam with high level of controlling the thickness and density that is scalable. First, manufacturing polyurea foam at room temperature and ambient conditions, eliminating the need of vacuum oven. Second, casting polyurea foams in sheets, where the mold can easily control the thickness while simultaneously controlling the density. As will be discussed later, the geometry of the mold, thus the geometry of the foam product, is arbitrary since the mixture can be easily injected, poured or casted in any geometry.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal subparts. As will be understood by one skilled in the art, a range includes each individual member.

This research reports the synthesis of novel polyurea foam that bridges the gap between open and closed cell polymeric foams by self-foaming a mixture of isocyanate, diamine, and deionized water in the absence of heat and vacuum. The spherical, semi-closed cell structure was found to have microscale large perforations on the surface of the cell due to the interactions between adjacent expanding cell walls resulting from the generation of $CO_2$ gas. Additionally, small holes were found to form and concentrate along the bottom portion of the cells. The large perforations and small holes contribute to the unique microstructure of the polyurea foam reported herein. The manufacturing process was also found to promote the nucleation and deposition of polyurea microspheres on the walls, adding a reinforcement phase while overcoming the fundamental interfacial issue between the matrix and reinforcement due to both phases being made of the same material.

Figure 2:
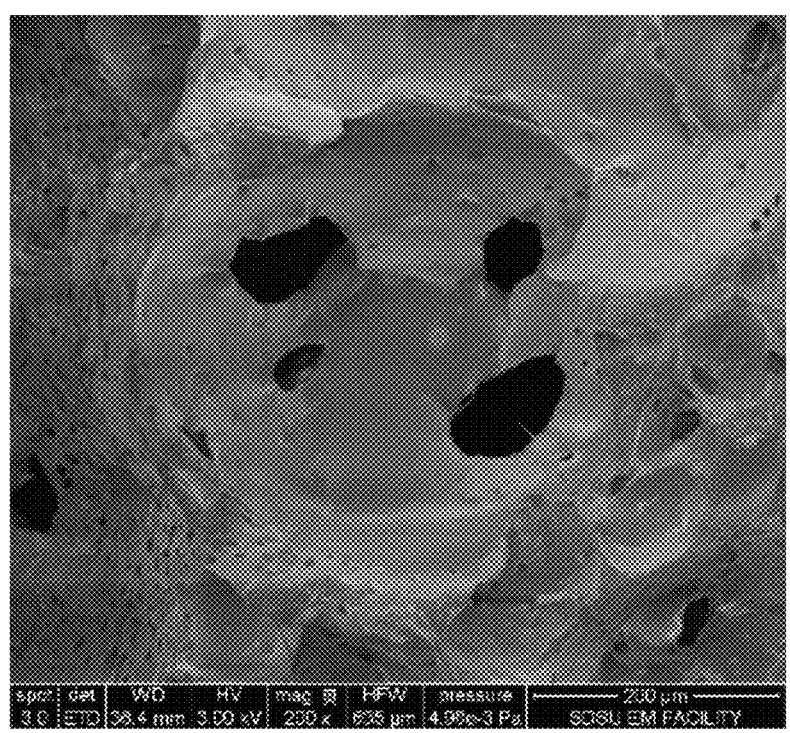
FIG. 2 is scanning electron microscopy images showing higher magnification of the foam cell structure, and shows that the inventive polyurea foam is hierarchical because the large foam cells are surrounded with smaller cells embedded in the walls around each cell.
Figure 17:
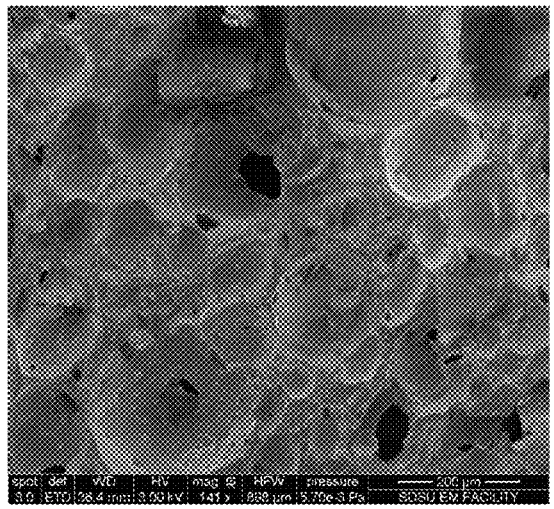
FIG. 17 (a)-(i) are a series of scanning electron microscopy images showing higher magnification of the foam cell structure.
Figure 17:
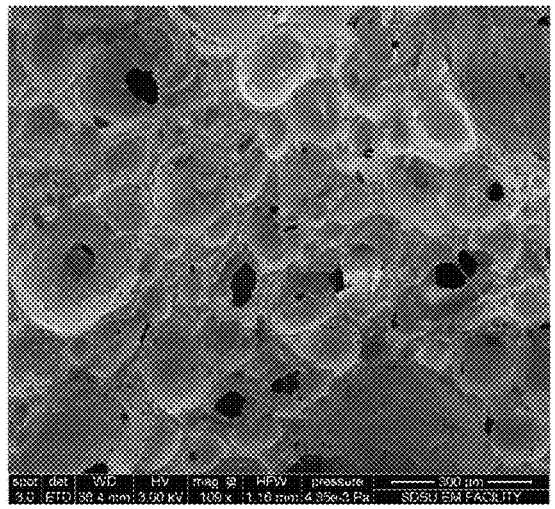
Figure 17:
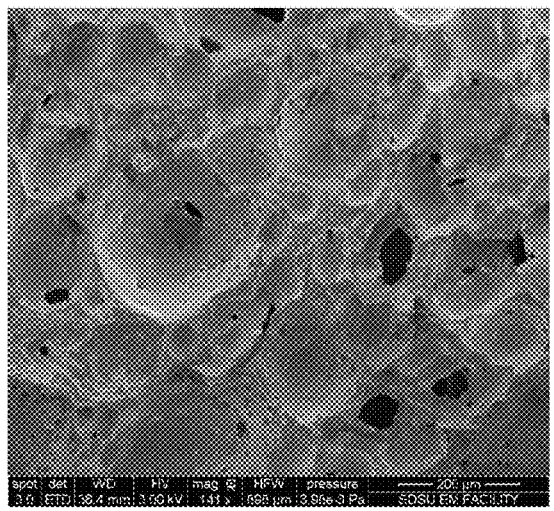
Figure 17:
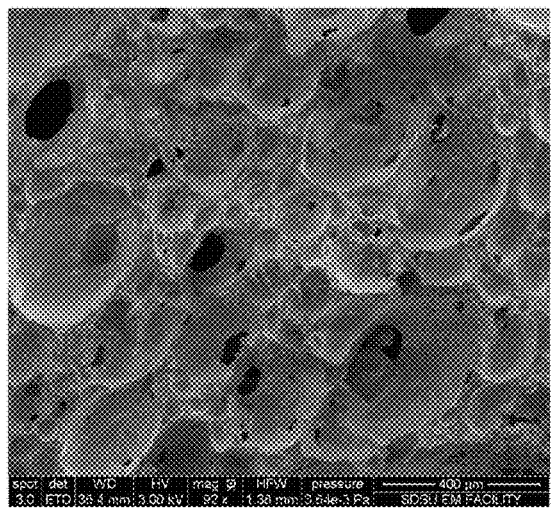
Figure 17:
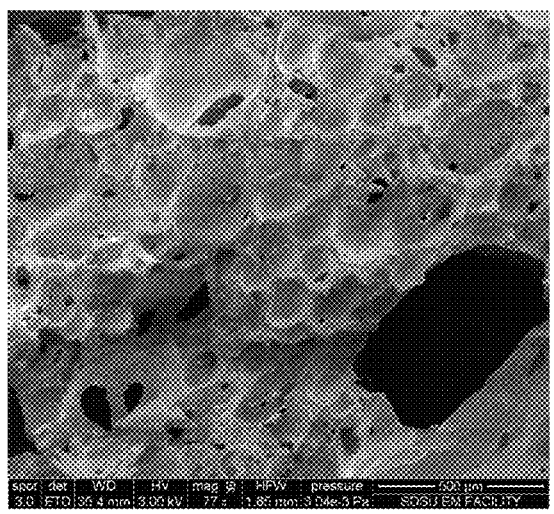
Figure 17:
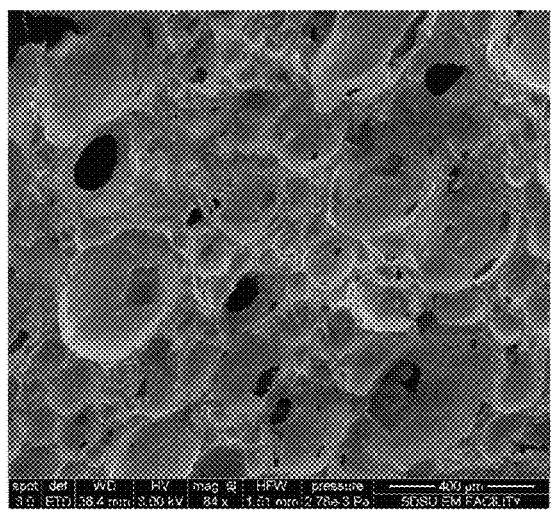
Figure 17:
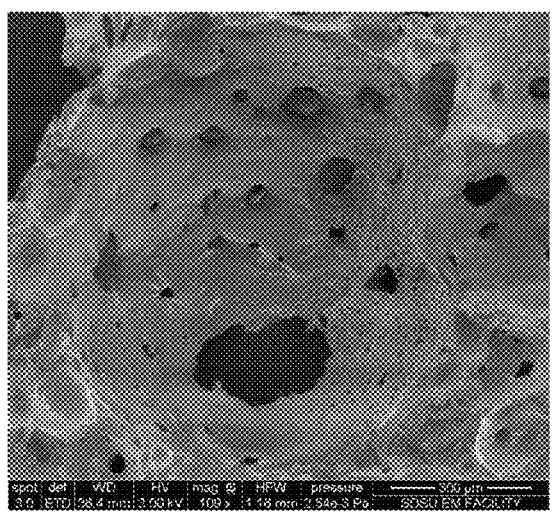
Figure 17:
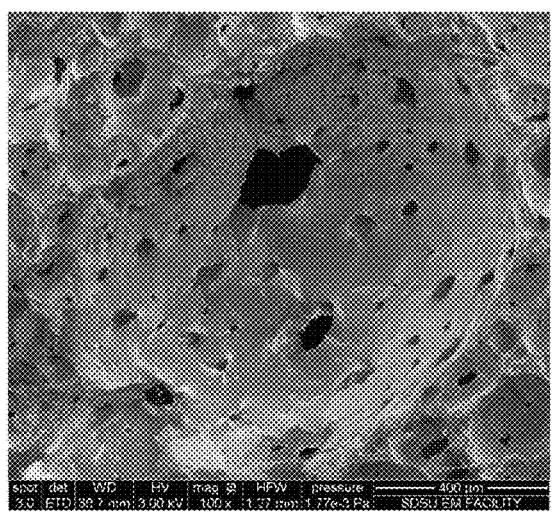
Figure 17:
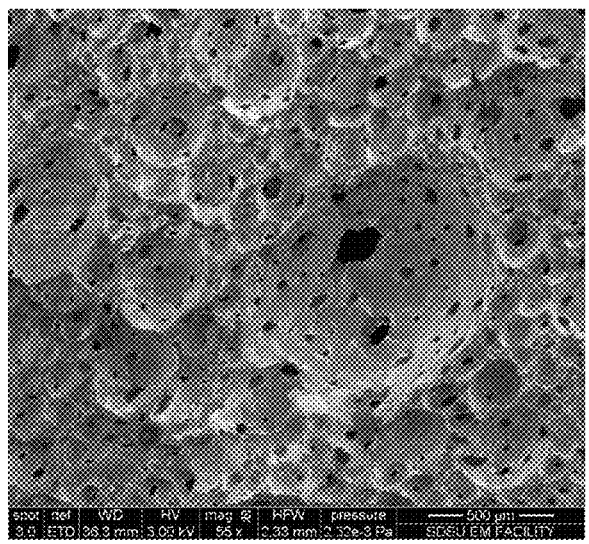

Referring now to FIGS. 1, 2, and 17 etc., it is shown that we successfully and repeatedly manufactured hierarchical semi-closed cell polyurea. Our polyurea foam is hierarchical because the large foam cells are surrounded with smaller cells embedded in the walls around each cell. We have also tested the flexibility of the manufacturing process disclosed below to produce different thickness, different foam density, and different mechanical properties.

Example—Process of Manufacturing Foaming Polyurea

Polyurea is an elastomeric polymer that is made by mixing 4:1 ratio by weight of polytetramethyleneoxide-di-p-aminobenzoate (Air Products Versalink P-1000 Oligomeric Diamine) and polycarbodiimide-modified diphenylmethane diisocyanate (Dow Chemical Isonate 143L) to form urea bonds. The diamine extenders allow for the high flexibility as well as initiate the reaction with the diisocyanate.

Changing the ratio of the diamine and diisocyanate influences the mechanical and physical properties polyurea, hence it is the first aspect in tailoring the properties of the foam to match the desired application. Herein, we focused on 4:1 ratio since it represents the most common ratio for impact mitigating polyurea and it represent 1:21 ratio by molecular weight. The blowing or foaming agent can be used herein is tap, distilled or deionized water, where the form of water was shown to have no effect of the foaming process. Herein, we used deionized water for consistency and to impose a control on the manufacturing process for ease of comparison of fabricated polyurea foam properties. The addition of water to the mixture of polyurea generates carbon dioxide ($CO_2$), which is the blowing gas responsible of forming the foam cells. Changing the ratio of water foaming agent with respect to the ratio of polyurea mixture of diamine and diisocyanate affects the production of $CO_2$ thus controlling the cell size and distribution, therefore it is the second aspect of tailoring the properties of polyurea foam. The biggest problem is thoroughly mixing the three foam constituents (e.g., diamine, diisocyanate, and water) in large quantities, which is the reason we use a shear mixer to overcome this problem. Thus, our innovative process is highly scalable since the shear mixer specification can be scaled accordingly. First, the mold design and innovative features are discussed then we list the step-by-step process to manufacture polyurea.

Example—Mold Design

Referring now to FIGS. 3-14, there is provided a series of figures to illustrate one nonlimiting embodiment of a design of the mold to create polyurea foam sheet with adjustable thickness and density. The size of the mold can be easily adjusted to fabricate rectangular or square foam sheets with different specifications.

Figure 3:
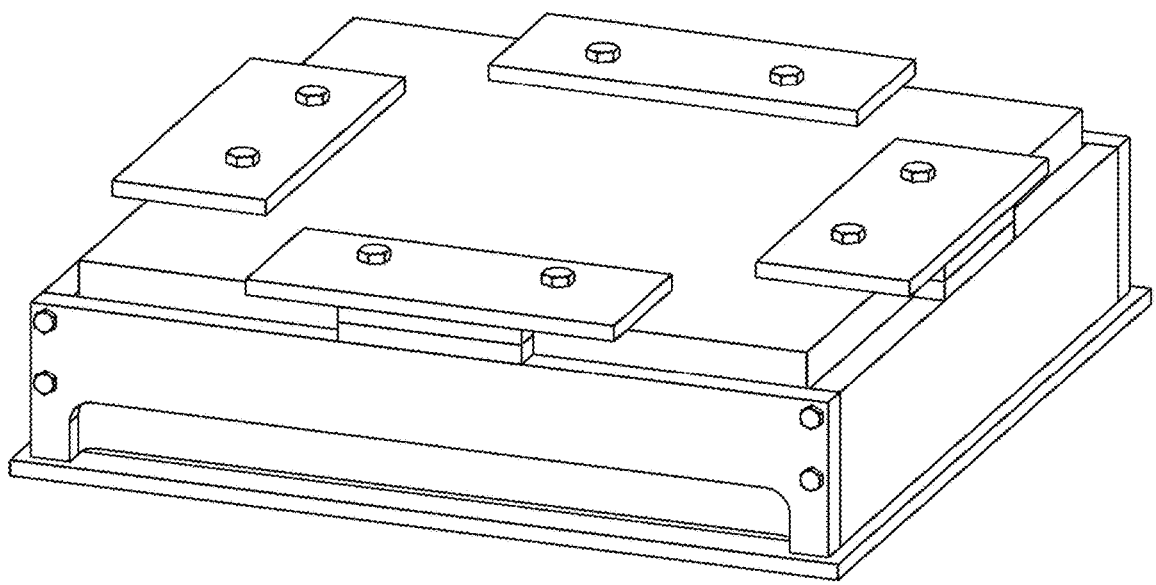
FIG. 3 is an illustration of an isometric view of the mold design.
Figure 4:
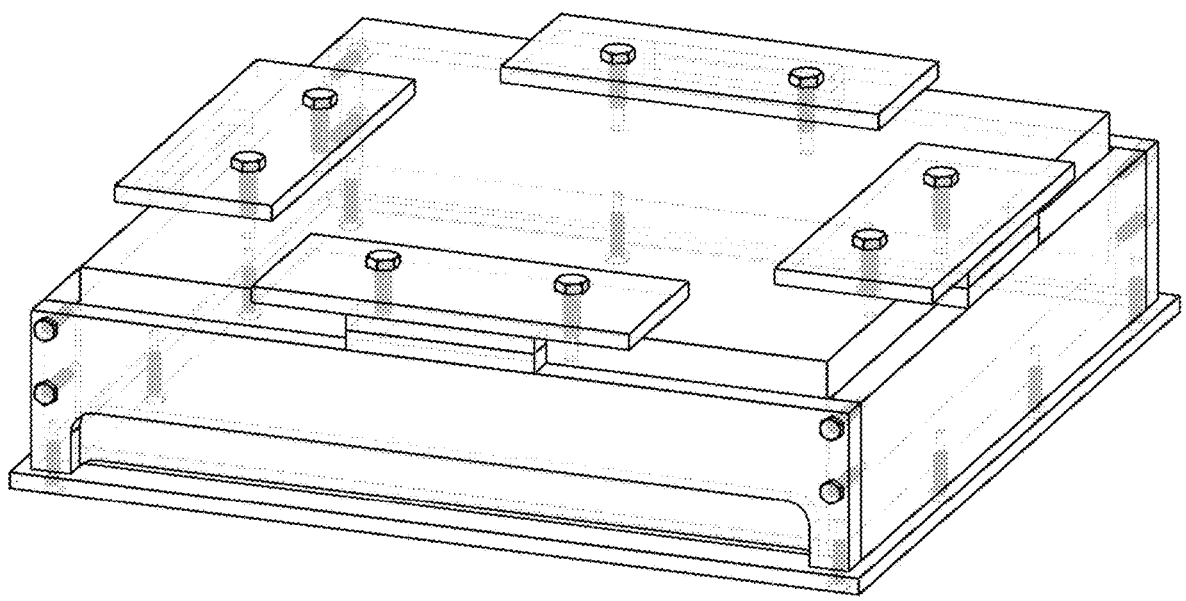
FIG. 4 is a transparent illustration of the isometric view of the mold design showing the fasteners.

FIG. 3 shows the fully assembled mold in isometric view with fasteners shown and without the fasteners (FIG. 4). The fasteners can be replaced with any other permanent or removable attachment mechanism such as glue, welding, or any other method apparent to those are skilled in the field. However, the mold shown in FIG. 3 has a square surface area, the change of the surface area and geometry is easily accomplished by creating a new mold.

Figure 5:
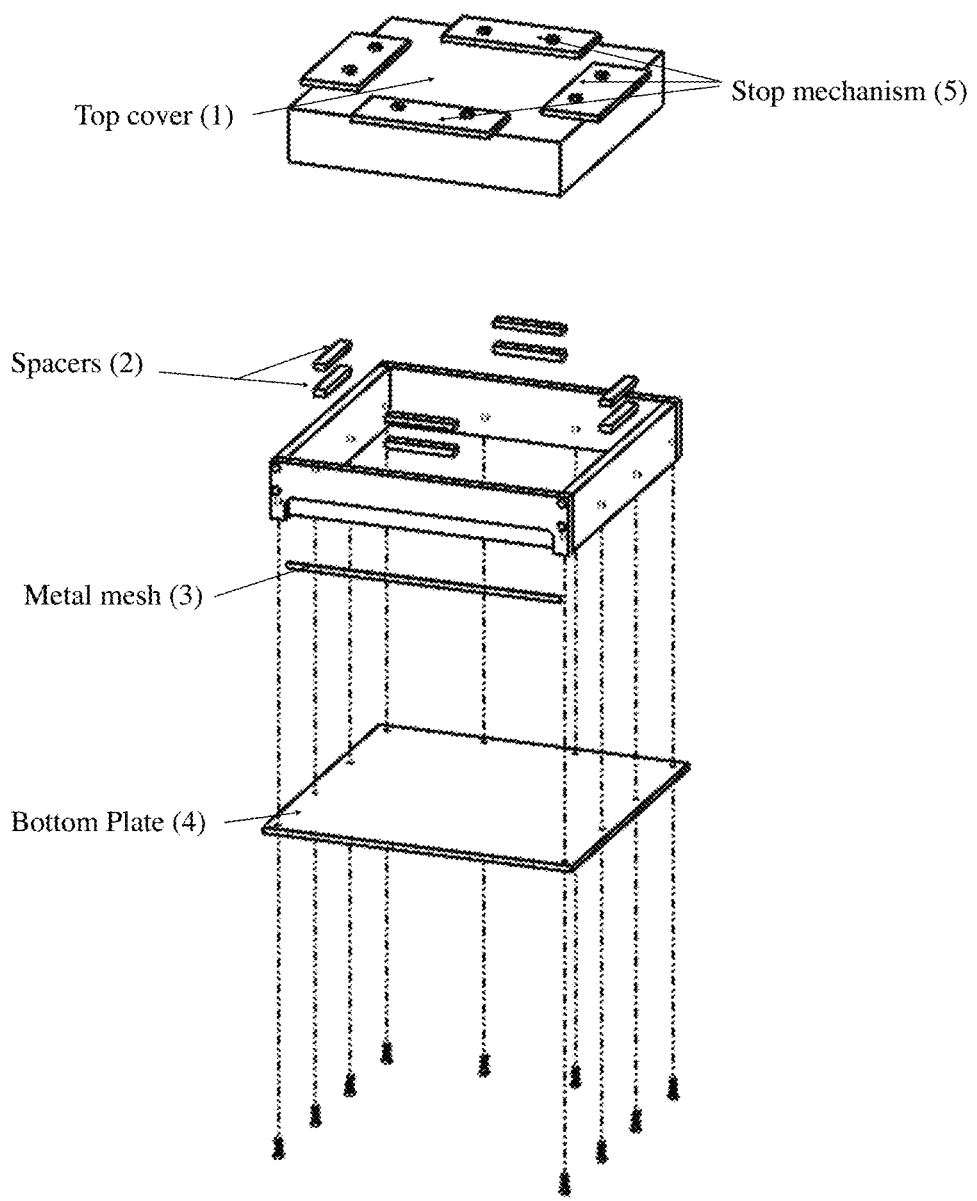
FIG. 5 is an illustration and shows the exploded view of the mold design with top cover having stop mechanisms, spacers, metal mesh, bottom plate, and fasteners.
Figure 6:
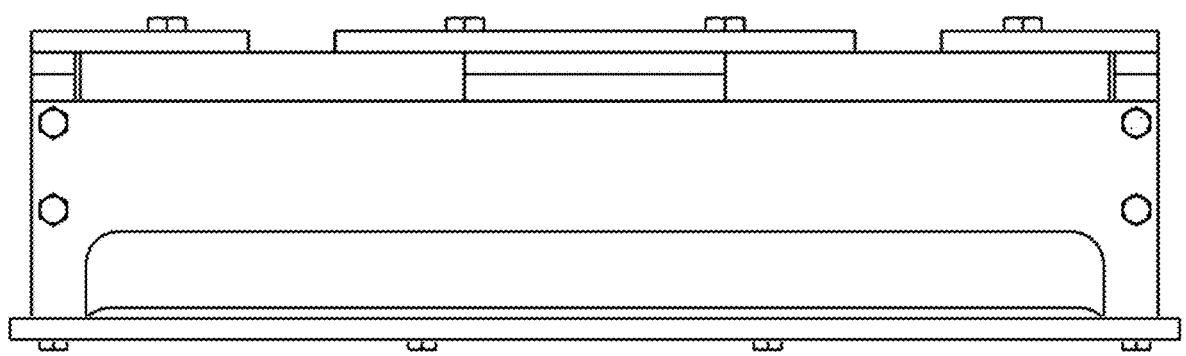
FIG. 6 is an opening side view of one embodiment of the present invention.

FIG. 5 shows the exploded view of the mold design, in which specific innovations are highlighted. The top cover (item 1) of the mold is made of polyethylene to ensure the flatness of the foam sheet and to prevent adhesion between the mold and the foam materials during the curing process. The top cover thickness was chosen to compress the foam during the curing process due to its weight. Additional set of compression clamps or weights can be used between the top cover and bottom plate to avoid top cover of floating above the mixture during curing without proper contact with the foam surface. The top cover has four metal brackets (item 5) that act as a stop mechanism to prevent the top cover from displacing into the mold beyond the desired thickness. The second innovation to allow adjusting the thickness is the spacers (item 2), which are made from aluminum, but other materials can be used, with different heights. When stacked together, the spacers control the thickness of the foam sheet by holding the top cover (item 1) at specific distance from the bottom plate (item 4). A metal mesh (item 3) is placed on one side of the mold to block the foam slurry from escaping while allowing excess water to escape the mold.

Example—Process of Mold Preparation

In one non-limiting preferred embodiment of the mold preparation aspect of the invention, there is provided a series of detailed steps.

STEP 1: Clean all surfaces of the mold that will contact the foam sample with isopropanol STEP 2: Create wax paper mold linings (two sheets needed. (a) Cut two sheets of Reynolds Wax Paper 15 inches long (standard width is 11.9 in). (b) Carefully apply strips of packing tape to cover the entire back side of each sheet of wax paper. Packing tape strips must be at least 12 in long and centered on the 15 in sheet. This must be done so there are no wrinkles or air bubbles present. Note: the wax paper surface must be the one to contact the foam, not the packing tape surface.

STEP 3: With the mold disassembled, apply a thin coat of silicone grease to the bottom surface on the main aluminum body of the mold. Do not clog threaded holes with grease.

STEP 4: Place one of the wax paper linings across this greased surface of the mold. (a) The tape surface will be facing upward from this position (wax paper surface should be pointing into the mold). Wax paper should be pulled tight with no wrinkles, and cover three sides of the mold, excluding the side with the drain. Orient the wax paper lining so that the long sides do not cover the side with the drain. (b) Secure the wax paper linings to the outside of the mold with packing tape on three sided (excluding the drain side). Create easy-to-remove pull tabs for the tape, to simplify the removal process. (c) Carefully cut out circles with a razor blade to expose the threaded holes covered by the wax paper lining (only 4 holes should have been covered if installed properly). (d) Reapply a thin coat of silicone grease to any areas that have been covered by the lining, in the locations that received the original coat of silicone grease.

STEP 5: Attach the bottom plate of the mold to the main aluminum body of the mold. Fasten all joining bolts with a 5/16" socket. Do not over tighten. Wipe off excess silicone grease.

STEP 6: Place the desired aluminum spacers on the top edges of the mold sides, placed in the center of each side (4 total). The spacers control the sample thickness. (a) Secure spacers with Scotch tape. Tape should be used on the sides of the spacers only, so that the thickness is not affected.

STEP 7: Use the second wax paper lining to cover the polyethylene mold lid. (a) Make sure the wax paper surface is facing into the mold and will be the one contacting the foam (the packing tape surface should be in contact with the mold lid surface). (b) Attach the wax paper lining to the mold lid with packing tape on the two long sides of the lining. Create easy-to-remove pull tabs that extend all the way to the outside (the top) of the mold lid. This will allow the lining to be released while the mold is closed.

STEP 8: Spray all surfaces of the mold (lid and base pieces, including the wax paper linings) that will contact the foam sample, including the outside of the drain, with Dry Film Release Agent and let dry. Spray wire mesh and magnets separately. Place all components on a spill tray, or other suitable surface when applying the spray.

STEP 9: Place the three magnets, in their indicated orientations, in the drain slot outside of the mold. Place the wire mesh on the inside of the mold in front of the drain. Manipulate the mesh to provide complete coverage of the drain.

Example—Process of Preparing a Mixing Container

In one non-limiting preferred embodiment of the mixing container preparation aspect of the invention, there is provided a series of detailed steps.

STEP 10: Use a plastic disposable 5-quart bucket lining for mixing of the foam.

STEP 11: Create a splash-guard for the bucket using wax paper. (a) Attach the wax paper to the entire inside circumference (roughly 1 inch down from the top surface) of the bucket with Scotch Tape. (b) Make a V-shaped cut roughly ¾ of the way down the wax paper splash-guard to allow the mixer to easily fit through, to ensure easy access during the mixing process.

Example—Shear Mixer Preparation

In one non-limiting preferred embodiment of the shear mixer preparation aspect of the invention, there is provided a series of detailed steps.

STEP 12: Disassemble all components of the shaft and mixing heads and place them on a spill tray, or other suitable surface.

STEP 13: Generously spray the mixer components with Dry Film Release Agent and let dry. Make sure to spray all threads and internal sections of the components.

STEP 14: Assemble the mixer and spray components lightly again with the release agent and let dry.

Example—Slab Molding Preparation

In one non-limiting preferred embodiment of the slab preparation aspect of the invention, there is provided a series of detailed steps.

STEP 15: Measure out the necessary amounts of the following ingredients: (a) Versalink P-1000 (polytetramethyleneoxide-di-p-aminobenzoate); (b) Isonate 143L (methylene diphenyl diisocyanate)—(b)(i) The ratio of Versalink to Isonate must be 4:1 by mass; (c) Deionized Water—(c)(i) The ratio of the combination of Versalink and Isonate to Deionized water must be 8:3 by mass; (d) To produce a foam sample with a thickness of 0.75 in, use the following masses: Versalink: 429.9 g, Isonate: 107.5 g, Deionized Water: 1,433.0 g.

STEP 16: Heat Isonate to 98 degrees Fahrenheit. Hold at this temperature for 45 minutes, then immediately stir vigorously for 2 minutes. Allow Isonate to return to room temperature. (a) This is done to break up any crystallization in the Isonate.

STEP 17: Place the assembled mold base on a laboratory scale: (a) Align the drain over a spill tray to contain the water spillage, (b) Elevate the back edge of the mold opposite of the drain slightly (roughly ⅛ in), (c) Tare the scale, (d) Place blocks in the spill tray to set the mold onto. The position of the mold on the blocks must allow bar clamps to be attached on all 4 sides of the mold. The mold side opposite of the drain must still be elevated ⅛ in when placed on the blocks, (e) Place a razor blade within reach. This will be used to make an incision in the bottom of the 5-quart bucket during the molding procedure.

STEP 18: Position the mold lid, bar clamps, and chemical ingredients within reach, to allow quick access during the molding process.

STEP 19: Pour cleaning agent (Citristrip Paint and Varnish Stripping Gel) into a metal container to be used for cleaning the mixer components.

Slab Molding Procedure

STEP 20: NOTE: Requires 2 to 3 people (one to mix sample and immediately begin cleaning mixer, one to operate timer, pour sample into mold, close mold and attach bar clamps).

STEP 21: Pre-Mixing (Deionized water and Versalink): (a) Add the deionized water and then the Versalink to the mixing container. Use a tongue depressor with a flat edge to scrape all the substance into the mixing container, (b) Use the SCILOGEX D500 Homogenizer to mix the solution for 45 seconds. Use setting 1 on the mixer (Lowest setting, roughly 10,000 RPM). Submerge the mixer head roughly ⅔ of the way to the bottom of the container, at an angle of 15 degrees from the vertical. Slowly and consistently move the mixer around the mixing container during mixing.

STEP 22: Mixing (Deionized water, Versalink, and Isonate): (a) With the mixer turned off and suspended above the mixing container, add the isonate to the mixing container. Use a tongue depressor with a flat edge to scrape all the substance into the mixing container, (b) Use the SCILOGEX D500 Homogenizer to mix the solution for 45 seconds. Use setting 1 on the mixer (Lowest setting, roughly 10,000 RPM). Submerge the mixer head roughly ⅔ of the way to the bottom of the container, at an angle of 15 degrees from the vertical. Slowly and consistently move the mixer around the mixing container during mixing. The mixing should begin immediately following the addition of the Isonate, as this addition with start the reaction. STEP 23: Waiting period: (a) Let the solution sit for 45 seconds after mixing. This allows time for the reaction to occur, (b) Remove the splash-guard during this time, (c) Simultaneously, have the second person disassemble all components of the mixer head and shaft immediately—(c)(i) Remove as much foam as possible from components (working time less than 10 minutes), (c)(ii) Once satisfied, place all components in cleaning agent (Citristrip) and let sit for at least 15 minutes.

STEP 24: Immediately after the waiting period, move mixing container over the spill tray and make an incision (roughly 2 in long) on the bottom surface of the mixing container. (a) Allow all noticeable water to drain out of the incision (notice the foam separation from the water).

STEP 25: Pour mixture into the mold, as evenly as possible. (a) Do not scrape any of the mixture out of the mixing container. It is important that the mixture is added to the mold in a free-flowing pour to avoid unmixed portions that may accumulate on the sides and bottom of the mixing container. (b) Measure the mass of the mixture poured into the mold using the laboratory scale. Stop at the same number (or range) every time. (b)(i) For a 0.75 in sample thickness with the beforementioned masses, this number is 527 g (a range of 520 to 527 is acceptable). (b)(ii) Record the exact mass in the mold.

STEP 26: Remove the mold from the scale and tilt toward the drain. Attempt to burst any water pockets and drain excess water by tilting the mold in multiple directions. (a) Afterward, place the mold on the blocks in the spill tray.

STEP 27: Carefully place the mold lid into the mold. Make sure the aluminum tabs on the lid align with the aluminum spacers on the base of the mold. (The lid should be attached no more than 4 minutes after mixing stops, to ensure the foam fills the mold properly). (a) Quickly attach bar clamps (1 per side, 4 total) to limit the expansion of the foam and inhibit the lid from rising or becoming uneven.

STEP 28: Weigh the bucket with extra foam and record the value. Subtract bucket mass to obtain foam mass.

STEP 29: Leave sample in mold for 24 hours. Allow water to finish draining into the spill tray and dispose of the water.

Example—Foam Sample Removal

In one non-limiting preferred embodiment of the foam sample removal aspect of the invention, there is provided a series of detailed steps.

STEP 30: After 24 hours, remove the bottom plate of the mold from the main aluminum body of the mold, using a 5/16" socket. (a) Carefully remove the bottom plate without removing the wax paper lining from the sample.

STEP 31: Lift the easy-to-remove pull tabs on the mold lid and separate them from the mold lid. (a) Carefully remove the mold lid without removing the wax paper lining from the sample.

STEP 32: Carefully remove the foam sample from the aluminum surfaces of the mold by hand. Do not insert any sharp objects between the mold and the foam sample. Slowly peeling the sample creates the cleanest separation.

STEP 33: Once the foam sample is removed from the mold, slowly and carefully remove the wax paper linings from both sides.

STEP 34: Optionally, weigh the foam sample and record the mass. (a) Measure the average thickness of the sample. Take two measurements (at least) from each side of the sample, 8 total.

STEP 35: Optionally, weigh the bucket with the extra foam. (a) Record the number, subtract bucket mass to obtain foam mass.

Example—Characterization of Efficiency

Figure 15:
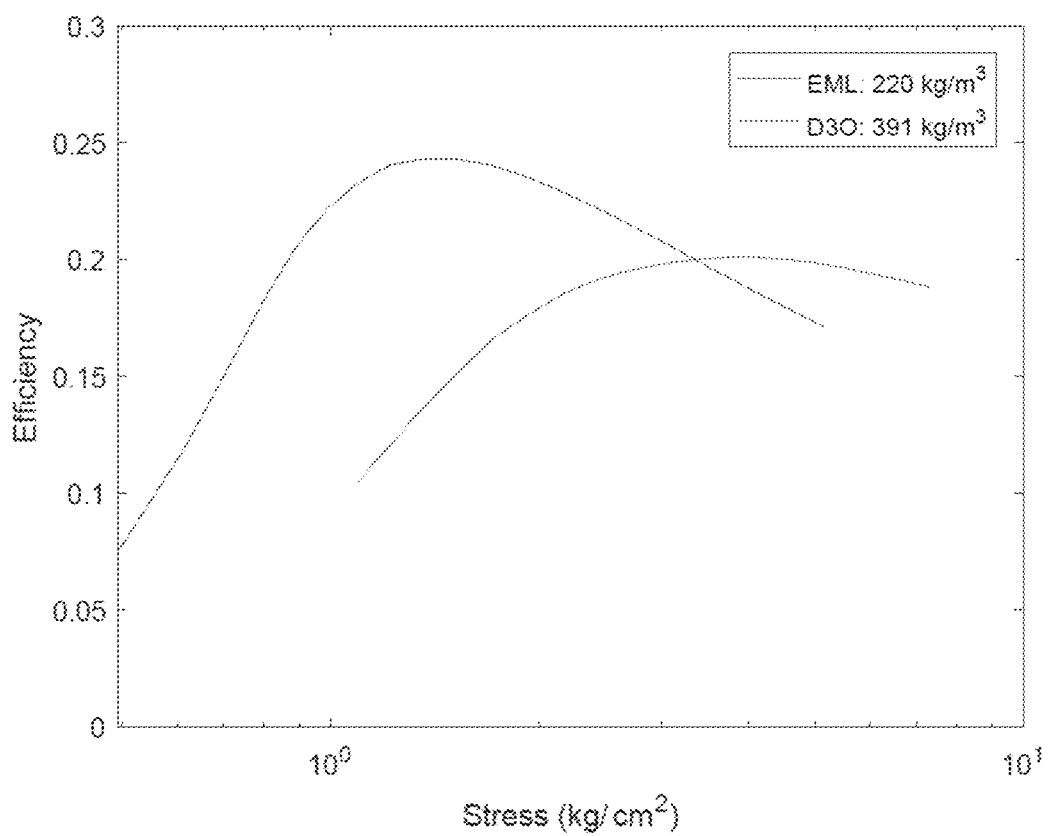
FIG. 15 is a graph of Efficiency (y) vs. Stress (x) and shows comparison between the efficiency of Polyurea foam (EML) and Market leading brand (D3O).

Referring now to FIG. 15 is a graph of Efficiency (y) vs. Stress (x) and shows comparison between the efficiency of the Polyurea foam of the invention (EML) and Market leading brand (D3O).

Figure 16:
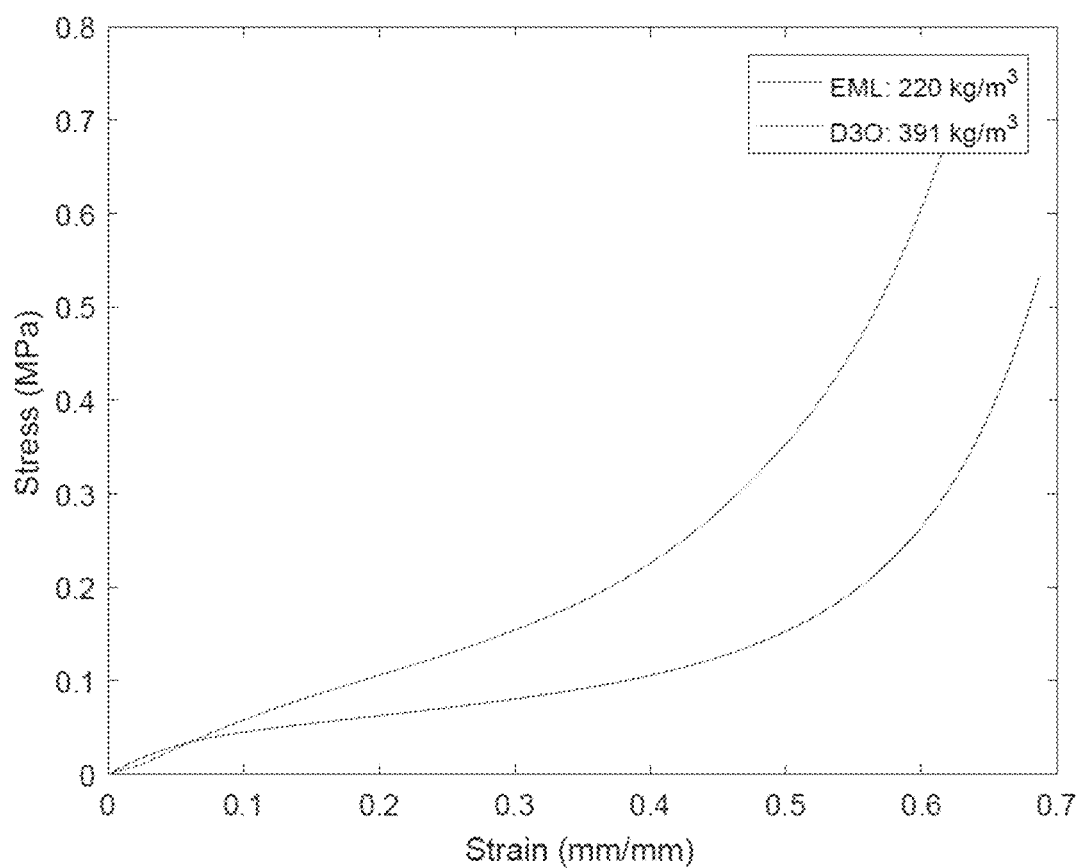
FIG. 16 is a graph of Stress (MPa) (y) vs. Stress (mm/mm) (x) and shows comparison between the efficiency of Polyurea foam (EML) and Market leading brand (D3O).

FIG. 16 is a graph of Stress (MPa) (y) vs. Stress (mm/mm) (x) and shows comparison between the efficiency of the inventive Polyurea foam (EML) and Market leading brand (D3O).

Figure 7:
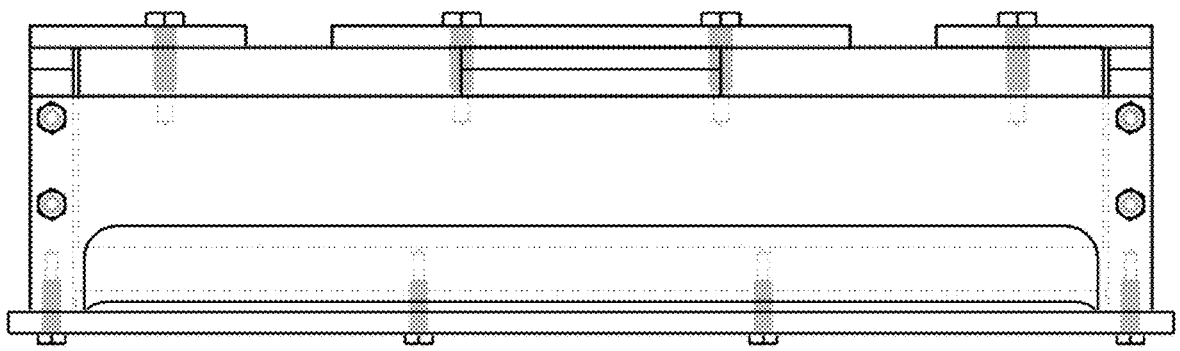
FIG. 7 is an opening side view of one embodiment of the present invention with transparent views of fastener positions.
Figure 8:
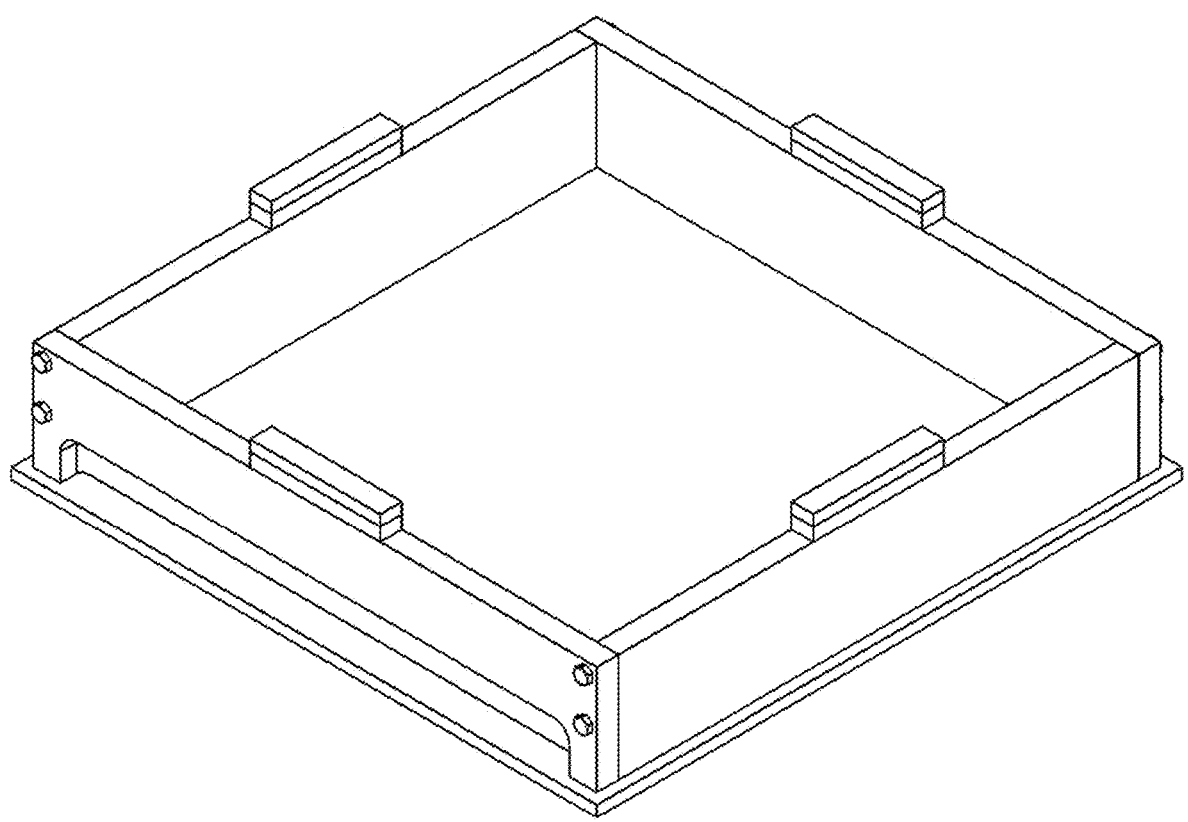
FIG. 8 is a top perspective view of a partial aspect of the present invention.
Figure 9:
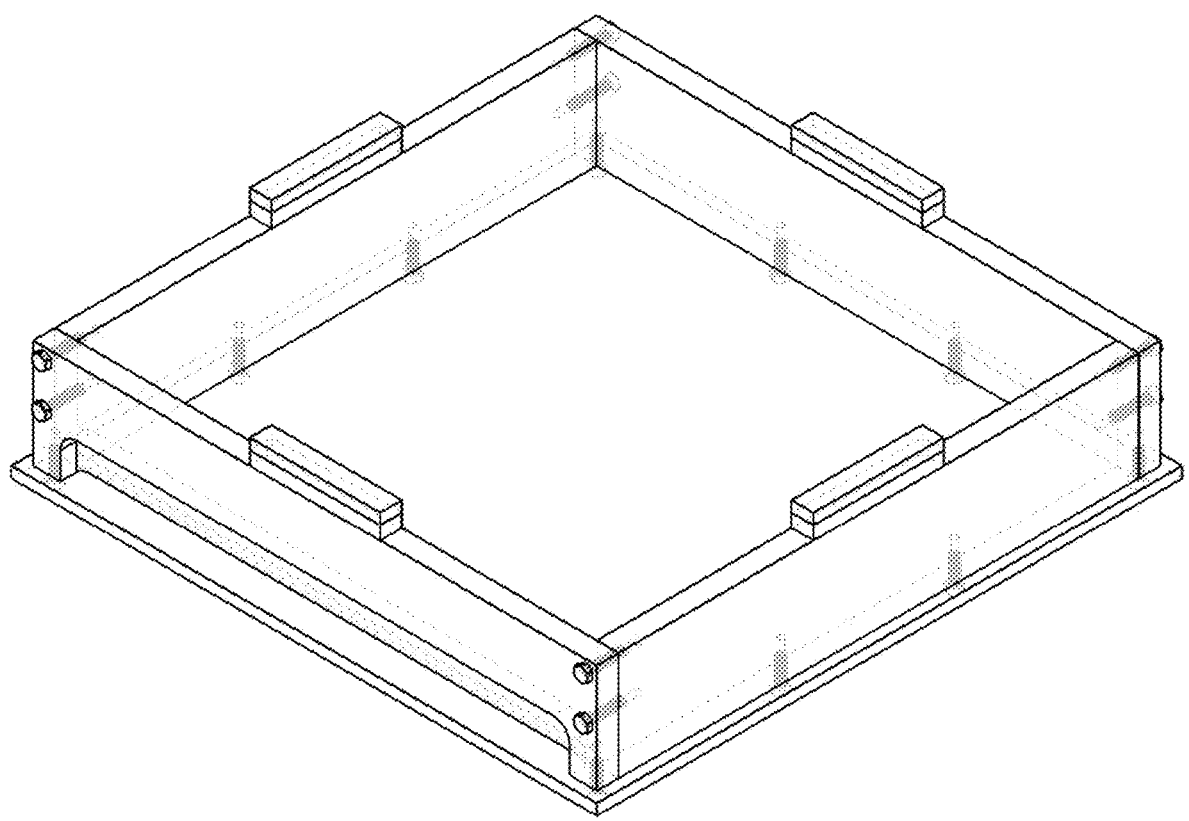
FIG. 9 is a top perspective view of a partial aspect of the present invention with transparent views of fastener positions.
Figure 10:
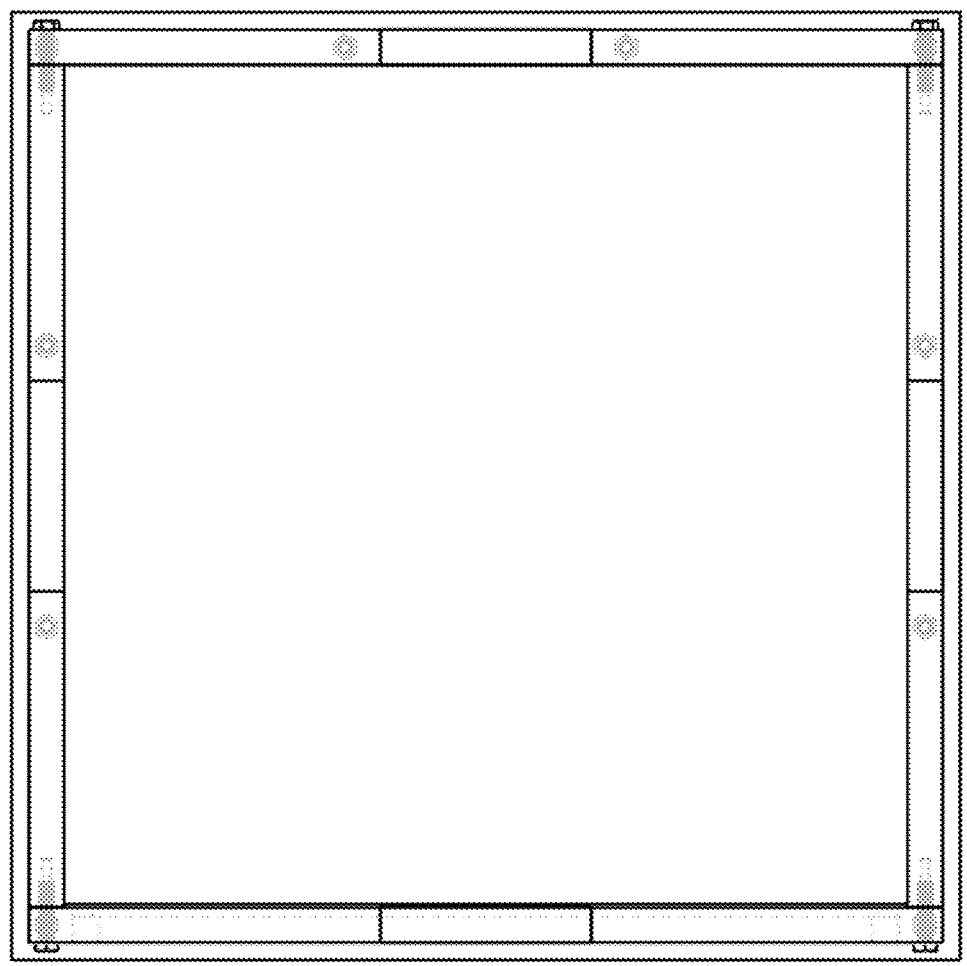
FIG. 10 is a bottom view of one embodiment of the present invention with transparent views of fastener positions.
Figure 11:
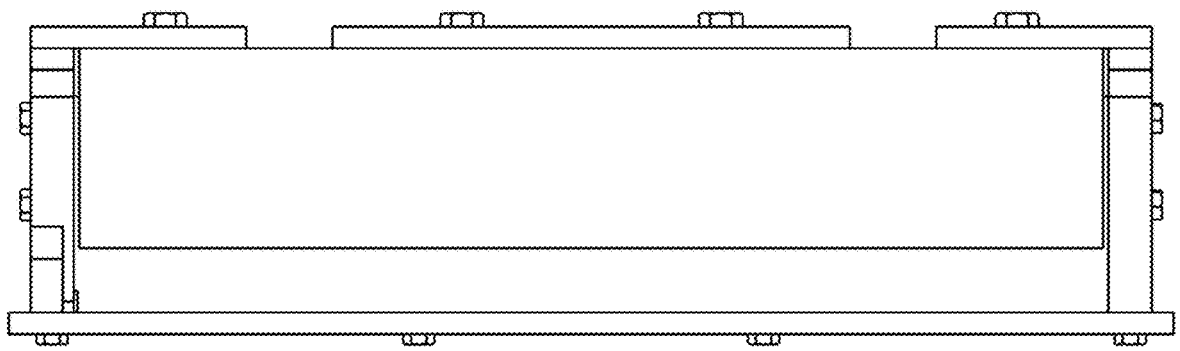
FIG. 11 is a side view of one embodiment of the present invention.
Figure 12:
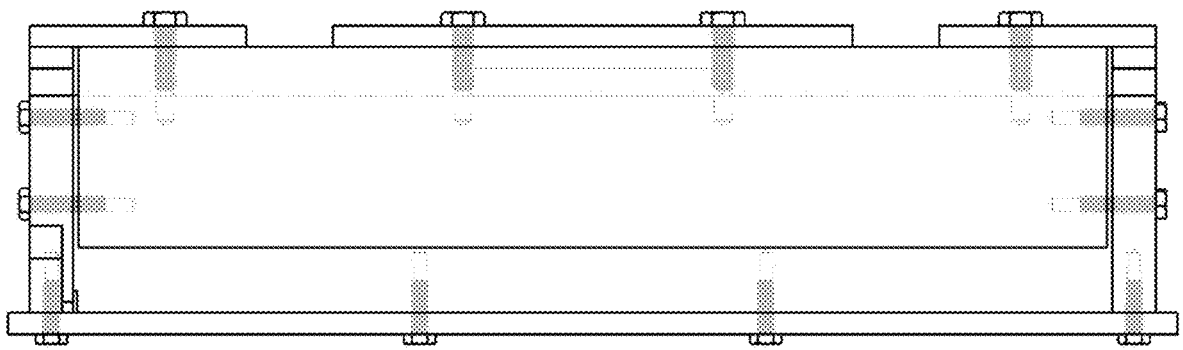
FIG. 12 is a side view of one embodiment of the present invention with transparent views of fastener positions.
Figure 13:
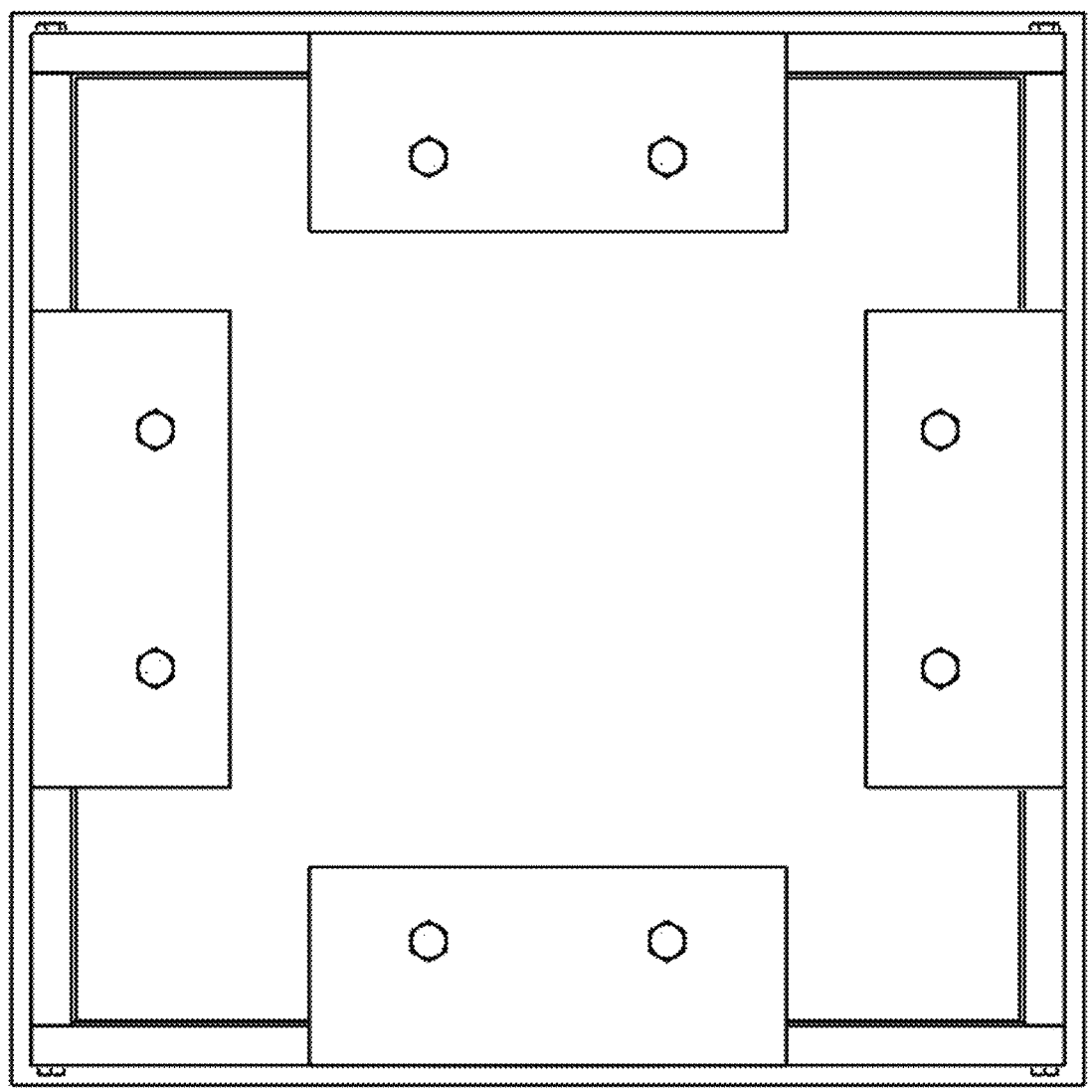
FIG. 13 is a top view of one embodiment of the present invention.
Figure 14:
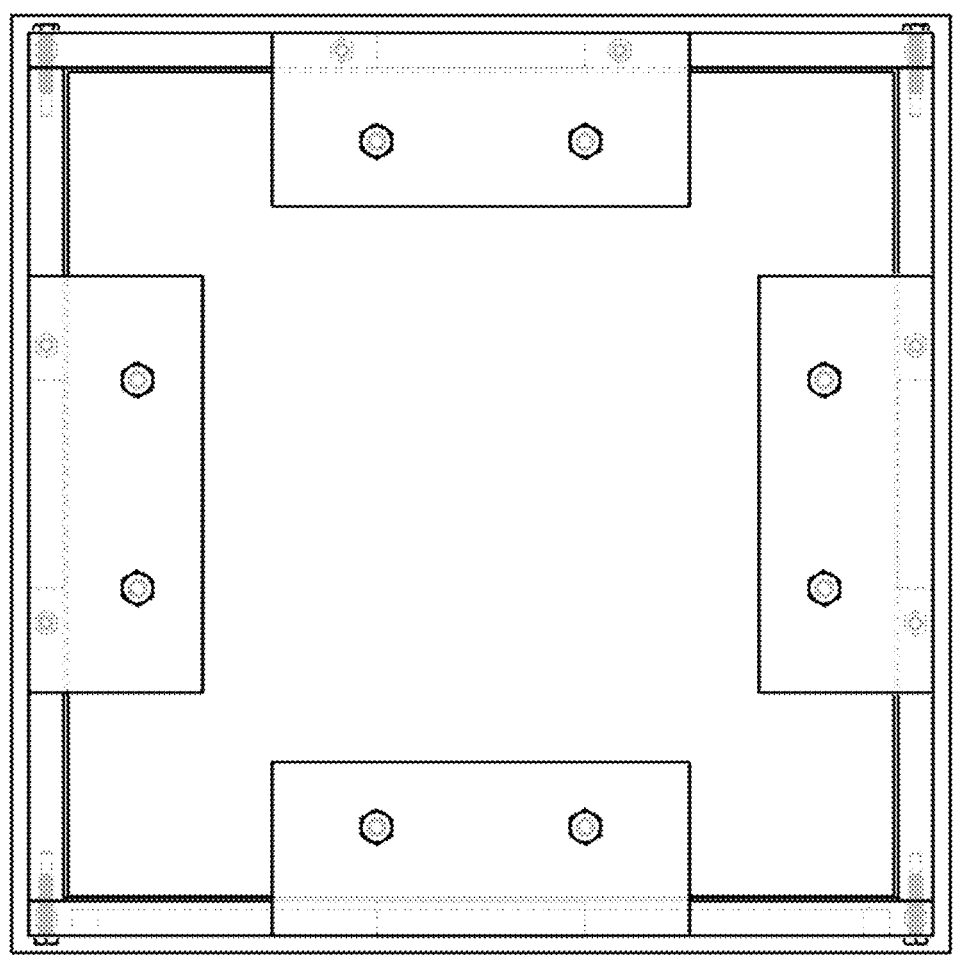
FIG. 14 is a top view of one embodiment of the present invention with transparent views of fastener positions.

FIG. 17 (a)-(i) are a series of scanning electron microscopy images showing higher magnification of the foam cell structure. FIGS. 7 (a)-(i) show that the inventive polyurea foam is hierarchical because the large foam cells are surrounded with smaller cells embedded in the walls around each cell.

Referring now to FIG. 18, Table 1 is a table comparing various features of the inventive polyurea foam (PU) versus a leading brand (LB). We compared the performance of our foam to the leading brand in impact mitigating foam, where our polyurea foam appears to be superior in multiple aspects. Table 1 below shows that polyurea outperforms the characteristics of the leading brand foam per kilogram of the material. Specifically, polyurea foam was found to be 20% more efficient in mitigating impact than the leading brand.

The inventive Polyurea foam has 44%, 15%, and 29% better specific strength, specific toughness, and specific modulus, respectively, than the leading brand currently in the market. It is worth noting that, using the method disclosed herein, it is easy to scale up to manufacturing polyurea foam with comparable density, which will obviously outperform prior manufacturing methods.

Auxiliaries and additives (c) suitable for use in accordance with the invention are, for example, the so-called internal release agents known from the prior art. Preferred internal mold release agents are those of the type described, for example in DE-OS No. 19 53 637 (equals U.S. Pat. No. 3,726,952), DE-OS No. 21 21 670 (equals GB-PS No. 1,365,215), DE-OS No. 24 31 968 (equals U.S. Pat. No. 4,098,731) and in DE-OS No. 24 04 310 (equals U.S. Pat. No. 4,058,492). Preferred release agents include the salts containing at least 25 aliphatic carbon atoms of fatty acids having at least 12 aliphatic carbon atoms and primary mono-, di- or polyamines containing 2 or more carbon atoms or amide or ester amines containing at least one primary, secondary or tertiary amino group; saturated and/or unsaturated esters containing COOH- and/or OH-groups of mono- and/or polybasic carboxylic acids and polyhydric alcohols having hydroxyl or acid numbers of at least 5; ester-like reaction products of ricinoleic acid and long-chain fatty acids; polyricinoleic acids; salts of carboxylic acids and tertiary amines; and also natural and/or synthetic oils, fats or waxes.

The oleic acid or tall oil fatty acid salt of the amine containing amide groups obtained by reacting N-dimethyl-aminopropylamine with oleic acid or tall oil fatty acid is particularly preferred.

In addition to these preferred release agents mentioned by way of example, it is also possible in principle to use other conventional release agents known per se either individually or in admixture with the preferred release agents mentioned previously. These other suitable release agents include the reaction products of fatty acid esters and polyisocyanates according to DE-OS No. 23 19 648; the reaction products of polysiloxanes containing reactive hydrogen atoms with mono- and/or polyisocyanates according to DE-OS No. 23 56 692 (equals U.S. Pat. No. 4,033,912); esters of polysiloxanes containing hydroxy methyl groups with mono- and/or polycarboxylic acids according to DE-OS No. 23 63 452 (equals U.S. Pat. No. 4,024,090); and salts of amino-polysiloxanes and fatty acids according to DE-OS No. 24 27 273 or DE-OS No. 24 31 968 (U.S. Pat. No. 4,098,731).

The internal mold release agents mentioned above are used, if at all, in a total quantity of from about 0.1 to 25% by weight and preferably in a total quantity of about 1 to 10% by weight, based on the reaction mixture as a whole.

Example—Foam sheets

Polyurea foam sheets (30.5 cm Long×30.5 cm Wide×1.9 cm Thick) were fabricated using a slab molding technique by combining Isonate® 143L (C15H10N2O2, modified Methylene Diphenyl Diisocyanate, DOW Industrial) and Versalink® P1000 (C70H124N2O16, oligomeric diamine, AirProducts Inc.) with deionized water (diH2O) as the blowing agent. Two density variations of polyurea foam, 227.3±4.5 kg/m3 and 355.8±18.6 kg/m3, were fabricated by adjusting the amount of the diamine, cyanate, and diH2O while maintaining all other mixing and curing conditions constant. After pouring into the mold, samples were left to cure under ambient conditions in the absence of heat and vacuum. Samples extracted from the sheets were then coated with ~6 nm of platinum and analyzed using Scanning Electron Microscopy (FEI, Quanta 450) in order to examine the microstructure of the novel foam.

Example

Figure 19:
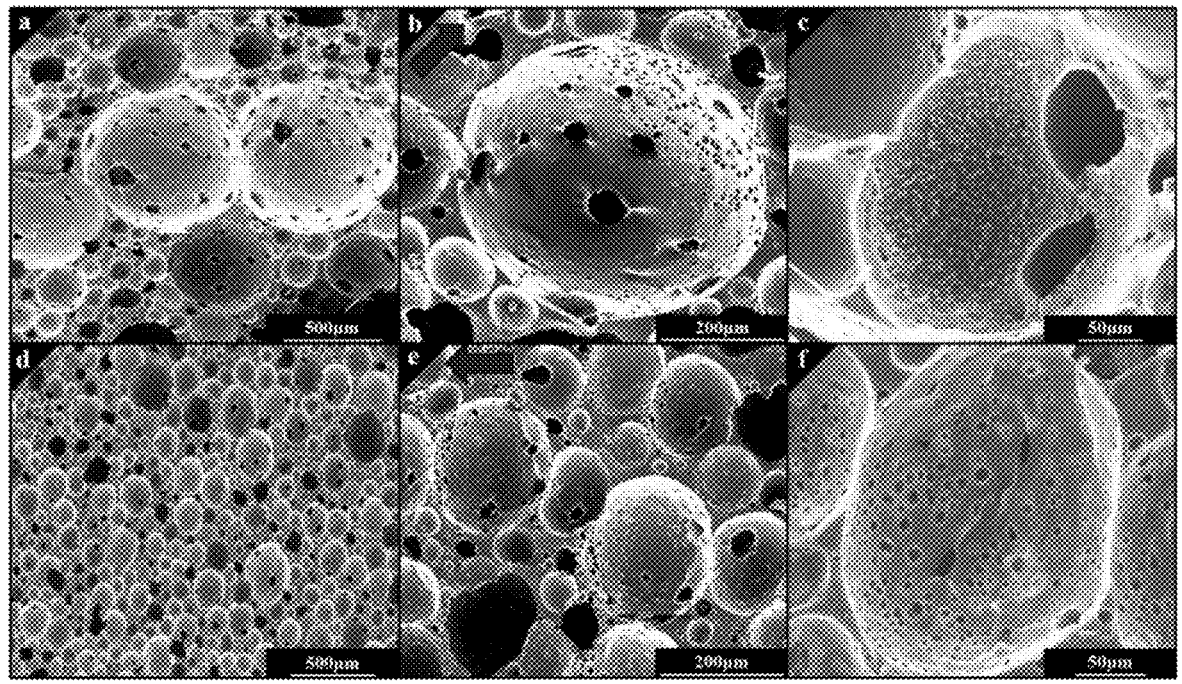
FIG. 19 is a series (a-f) of SEM micrographs of (a-c) low relative density (EML227) and (d-f) high relative density (EML350) polyurea foam showing cell perforation and deposits of microspheres.

FIG. 19 shows SEM micrographs of polyurea foams with low-relative density of 0.21 (EML227) and high-relative density (EML350) of 0.33. Image analysis of these micrographs reported that the average cell diameter of the EML227 foam was 134.5±108.5 μm, nearly 25% larger than those reported for EML350 ($\phi c,350$=90.9±48.9 μm). The variation between the cell sizes is a function of the initial mixing ratio of the chemicals and the blowing agent as well as the final sheet thickness. In short, a slurry containing higher amounts of constituents was poured into the same mold volume, which resulted in crowding the entrapped gas bubbles and in turn yielded an overall smaller cell diameter. Finally, the spread in the distribution of the cell size is associated with a hierarchal structure, where the walls separating adjacent large cells tend to entrap cells with smaller diameters. Such hierarchal microstructure plays a major role in the mechanical behavior of the foam under quasi-static.

The nucleation of CO2 gas bubbles due to the reaction between cyanate and diH2O continues to outwardly push on the surrounding walls resulting in the formation of the spherical microstructure shown in FIG. 19. The transformation of a spherical to polyhedral structure is impeded by the self-limiting chemical reaction creating CO2 and by the relatively short curing time of the polyurea elastomer. Nonetheless, the interplay between the internal gas pressure and the proximity of cells results in intersections between adjacent cells shown by the large perforations around the cell surface. The perforation formation process is clearly illustrated in FIG. 20.

Figure 20:
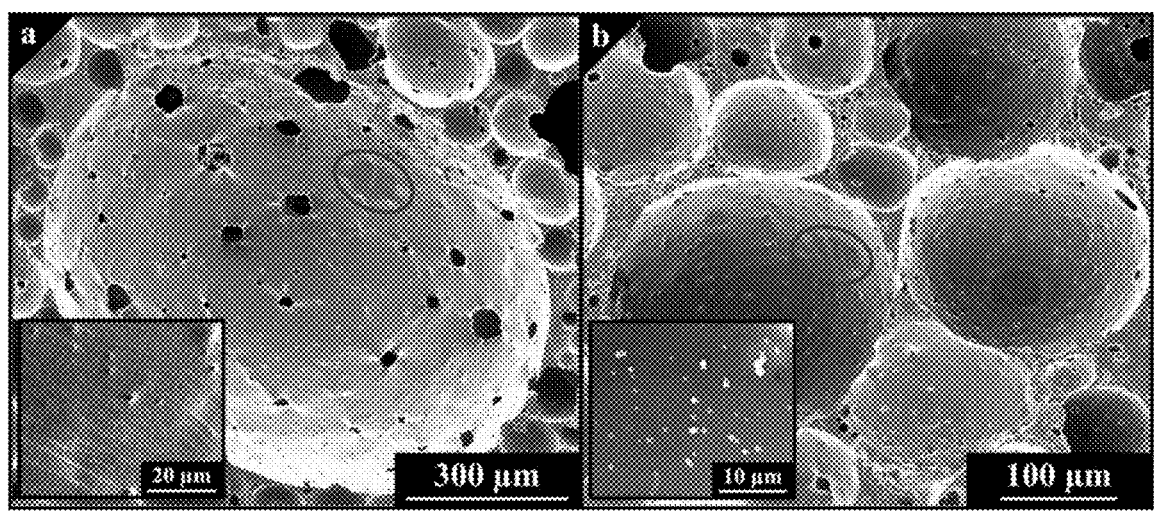
FIG. 20 is an illustration of a Perforation formation process in (a) EML227 and (b) EML350 polyurea foams (insets capture the stretch marks due to cell expansion during the foaming process).

At the sites circled in red on FIG. 20, portions of the cell walls appear to be much thinner sheaths, depicting areas where large perforations would have been created if the cell wall expansion due to CO2 generation had continued. This mechanism is also confirmed by closely examining the periphery of existing perforations, where the ruptured edges are curled towards the cell with lower internal pressure. The rupture process occurs when the strength of the viscous polymer sheath is well below that of the applied tension in the cell wall due to the internal gas pressure. Additionally, the insets in FIG. 20 reveal stretch marks on the cell walls formed by the gas pressure entrapped inside the cells during the curing process prior to setting, which is also assisted by the pressure from the mold enclosure to control the dimensions of the sheets.

Example—Semi-Closed Cell

Along with these large perforations, ubiquitous small holes are preferentially located on one side of the cell, where the nucleation of the holes is correlated with the formation and precipitation of polyurea microspheres. In essence, the formation of microspheres implies a relatively high local concentration of isocyanate that continues reacting with the entrapped diH2O resulting in a localized CO2 generation, hence the presence of the smaller holes. Overall, the cell faces (or walls) of our novel polyurea foam contains only ~7.6% and ~4.5% open-space, comprising of perforations and holes, for EML227 and EML350 respectively, hence its classification as 'semi-closed cell'. Here, it is important to note that the newly reported 'semi-closed cell' foam structure implies transversely-isotropic mechanical behavior while partially-open/partially-closed cell exhibits anisotropic behaviors on the macroscale level.

FIG. 19b,e show the preferential direction at which the small holes nucleate on the lower portion of the foam cell. This phenomena is associated with two concurrent processes. First, the aggressive mechanical mixing of amine and isocyanate into diH2O resulting in an emulsion of chemicals that in turn polymerizes and creates microspheres. Secondly, as the foam structure starts to form, its density is less than that of diH2O causing the foam slurry to rise and float above the surface of the water. During the rising process, the water is drained (directions denoted with blue arrows on FIG. 19b,e) at a relatively high speed due to the size of the cell and in the process pulls the suspended microspheres towards the bottom of the cell. Since the deposition of the microspheres happens early in the curing stage, the ongoing chemical reaction between un-polymerized cyanate and residual diH2O on the bottom surface continue to locally produce CO2, hence the presence of small holes at these locations.

Figure 21:
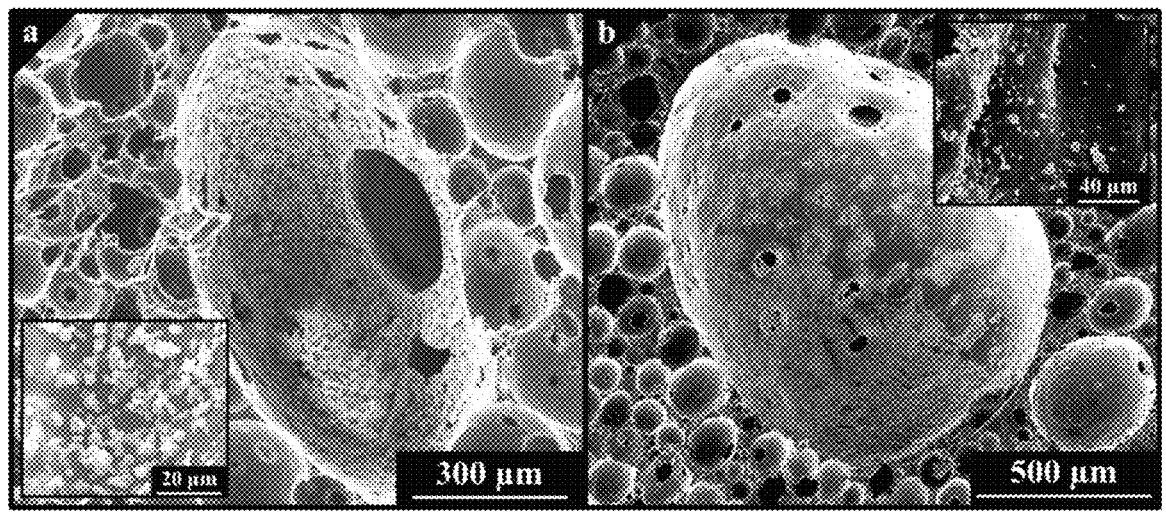
FIG. 21 is an illustration of Self-reinforcement of foam by self-assembled polyurea microspheres on (a) EML227 and (b) EML350 internal cell walls.

One of the unique aspects of our novel polyurea foam is its self-reinforcement by polyurea microspheres (FIG. 21). In other words, our foam is a self-assembled polymer/polymer composite, where the microspheres improve the strength and increase the force required to buckle the walls during loading scenarios such as impact forces. The microspheres are created through a modified precipitation polymerization process, in which the isocyanate reacts with the amine molecules emulsified in diH2O by the high speed, aggressive mechanical mixing process. In our process, the microspheres are a byproduct of the foaming process, where the initiator and suspension liquids are the same, being diH2O. The absence of elastic mismatch as well as chemical mismatch between the matrix phase (i.e., the cell walls) and reinforcement phase (i.e., microspheres) eliminates the inter-phasic region, hence substantially reducing the residual stresses at the interface between the two composite phases.

Example—Stress-strain Characterization

Generally, foams are classified with either open-cell or closed-cell microstructure, where the mechanical, electrical, and thermal properties are defined as a function of the properties of the base material. Furthermore, the overall stress-strain behavior of polymeric foams can be divided into three distinct stages corresponding to the elastic, plateau, and densification regions. Regardless of the region, scaling laws can be used to extrapolate the properties of the foam from those of the base material as a function of the cell microstructure.

First in the elastic deformation region, scaling laws may be used to calculate the elastic modulus of open-cell and closed-cell foams using Equations 1 and 2, respectively.

$$\frac{E^*}{E_s} = C_1 \left(\frac{\rho^*}{\rho_s}\right)^2 \tag{1}$$

$$\frac{E^*}{E_s} = C_1 \Phi^2 \left(\frac{\rho^*}{\rho_s}\right)^2 + C_2(1-\Phi)\frac{\rho^*}{\rho_s} + \frac{p_0(1-2\nu^*)}{E_s\left(1-\frac{\rho^*}{\rho_s}\right)} \tag{2}$$

Where, $E^*$ and $E_s$ are the elastic moduli of the foam and the base material, respectively; $\rho^*$ and $\rho_s$ are the densities of the foam and the base material, respectively; $\Phi$ is the fraction of solid material contained in the cell edges; $p_0$ is the fluid pressure inside the cell; $\nu^*$ is the Poisson's ratio of the foam; and C1 and C2 are constants of proportionality determined from the experimentally reported stress-strain curve. While the primary deformation mechanism present in open-cell foams is from the bending of the cell edges (shown by the single term in Equation 1), the closed-cell foams have three contributing mechanisms; namely cell edge bending, cell face stretching, and the compression of fluid inside the cell. These mechanisms are mathematically represented by the first, second and third terms in Equation 2, respectively. For typical engineered closed-cell foams, $\Phi$ is bounded between zero and unity, where the latter will reduce Equation 2 to Equation 1 when the working fluid is air, or in the other words, the foam is then classified as open-cell. The second region of the stress-strain curve is characterized by a plateau behavior of the compressive stress, where a minimal increase in compressive stress is associated with a large increase in compressive strain. The plateau region is attributed to the collapse of the cellular structure by buckling in elastomeric foams or by plastic crushing (failure) in rigid foams.

During an elastic matrix collapse, closed-cell foams have the added contribution of the pressure difference between the entrapped fluid and atmospheric pressure (pat). The onset of the plateau regime in elastomeric foams is defined by the elastic collapse strength ($\sigma^*$), which can be el calculated using Equations 3 and 4 for open-cell and closed-cell microstructures through a constant of proportionality (C3), respectively.

$$\frac{\sigma_{el}^*}{E_s} = C_3 \left(\frac{\rho^*}{\rho_s}\right)^2 \left(1 + \sqrt{\left(\frac{\rho^*}{\rho_s}\right)}\right)^2$$

$$\frac{\sigma_{el}^*}{E_s} = C_3 \left(\frac{\rho^*}{\rho_s}\right)^2 \left(1 + \sqrt{\left(\frac{\rho^*}{\rho_s}\right)}\right)^2 + \frac{(p_o - p_{at})}{E_s}$$

For synthetic foams, the pressure inside dry cells is approximately equal to the atmospheric pressure when tested at low strain-rates, resulting in elimination of the second term in Equation 4.

The final stage of compression occurs when cell edges come into contact with each other due to extreme collapse of the cellular matrix, resulting in densification. Additional strains induce compression of the matrix material itself, which marks the onset of the strain locking phase causing a drastic spike in the stress; hence the slope of the stress-strain curve in this region approaches the Young's Modulus of the base material. In other words, the onset of densification is characterized by the sharp non-linear rise in stress, where the critical strain ($\varepsilon_c$) at which the end of the plateau regime occurs can be defined by [5]

$$\varepsilon_C = 1 - \frac{1}{C_d}\left(\frac{\rho^*}{\rho_s}\right)$$

where, Cd is a constant of proportionality.

By considering the aforementioned scaling laws (Equations 1-4) that relate the properties of the base material to that of the foam, there are two major fundamental findings pertaining to the behavior of open-cell versus closed-cell foams, specifically in the elastic and plateau regions. First, the underlying structure of open-cell foam contains material only on the edges of the cell, which in turn reduces the resistance to deformation of the cellular material. On the contrary, the closed-cell foam structure does not only have solid struts on the edges but also has polymer sheaths on the surface of the cell, which in turn increases the overall stiffness due to the additional contributions of material and geometry, i.e. higher density indicates higher modulus (Equation 2).

In other words, the elastic modulus of open-cell foam is lower than that of closed-cell foam, which delays the transition into the plateau region.

The latter observation is deduced by carefully examining the equations for the elastic modulus implying Eopen<Eclosed and those for the onset of the plateau showing $\sigma^* < \sigma^*$. Second, open-cell foams display linear plateau behavior el,open el,closed (relatively constant stress with increasing strain) that is notably different than the increasing plateau behavior (increasing stress with increasing strain) seen in closed-cell foams. Additionally, when considering Equation 5 as the criteria for the end of the plateau region, the change in relative density can then be used to tune the strain percentage that marks the termination of this region, or in other words the start of the densification region. The desire to control the span of the plateau region stems from the ability to control the amount of energy under the stress-strain curve within this region, hence improving the effectiveness of the foam to mitigate an incoming impact. For the same base material and cell geometry, the relative density of open-cell foam scales as (tl)2 while closed-cell foam scales as (tl), thus a closed-cell foam structure exhibits a higher relative density than that of an open-cell structure, due to the addition of the cell wall material.

In short, closed-cell foams are a better performer in the elastic region while open-cell foams are superior in the plateau region. Therefore, a hybrid foam structure that leverages the uniqueness of both cellular structures is of scientific and industrial importance.

Example—Sample Preparation

Polyurea foam sheets were prepared by casting a slurry into an adjustable-height mold. The slurry was first prepared by mixing Isonate® 143L (modified Methylene Diphenyl Diisocyanate (MDI), DOW Industrial), Versalink® P1000 (oligomeric diamine, AirProduct Inc.) and distilled water (diH2O) with specific ratios that are predetermined based on the desired relative density of the foam. The mold was coated with nonstick Teflon spray to facilitate the quick release of the cured foam sheets. Once the constituents were mechanically and thoroughly mixed, the resulting slurry was quickly poured in the mold to avoid the initiation of curing within the mixing pot. The mold was covered with a nonstick high-density polyethylene block to control the thickness and maintain flatness of the top surface. However, although polyurea foam processes may be known, the process delineated herein is distinguished as a vacuum-free process.

This is important because of two specific aspects.

First, our polyurea foam slurry contains distilled water and thus placing the foam to cure under vacuum accelerates the evaporation of water resulting in a poor control of the cell size and geometry.

Second, the addition of vacuum curing complicates the manufacturing process and may result in premature degradation of the cell material because of the ongoing reaction between the cyanate and diH2O. Foams with different mechanical properties were produced by carefully adjusting the ratio of the foam constituents and the mechanical mixing duration. In all, two foam variations were fabricated with relative densities of 0.21 and 0.33, referred to herein as EML227 and EML350, respectively.

Once the foam sheets were cured in ambient conditions in the mold for 24 hours, the sheets were removed and left to air dry for 48 hours, at which it was noted that the foam sheets were water free. Samples with ~41 mm and ~25 mm diameter were die cut (Mayhew Pro 66002) from the 0.21 and 0.33 sheets using a hydraulic press (K.R. Wilson 37). The thicknesses of the samples were found to be ~17.2±0.4 mm and ~15.9±0.5 mm, respectively.

During the cutting process, it was noted that the speed of ram approach affected the final geometry of the sample, thus a moderate ram approach speed was used and resulted in uniform sample geometry, i.e., the hour-glass shape was drastically reduced.

Finally, in the effort to benchmark the newly synthesized polyurea foam, sheets of a closed-cell, proprietary formulation foam (referred to thereafter as benchmark) with a density of 397 kg/m3 were acquired from off-the-shelf products, cut with a nominal thickness of ~14.4 mm and tested as discussed next.

Example—Microstructure

Figure 22:
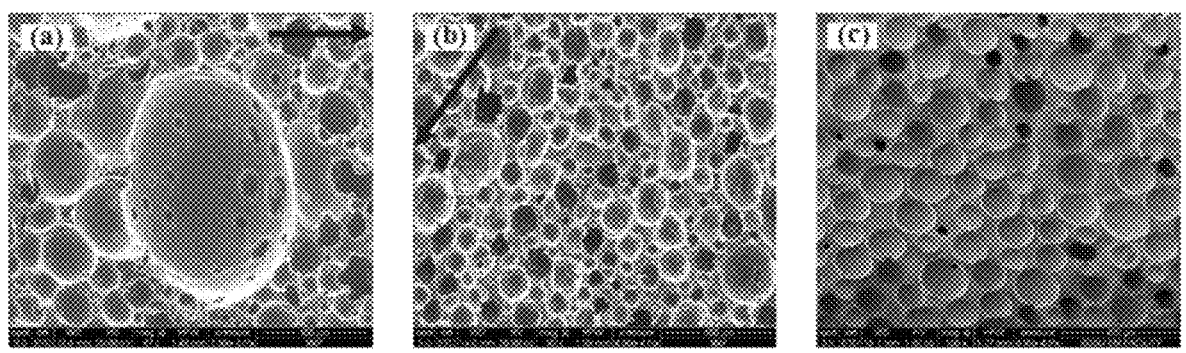
FIG. 22 is an illustration of Scanning Electron Microscopy scans of (a) EML227, (b) EML350 and (c) benchmark foam samples (arrows represent draining direction of diH2O).

FIG. 22 shows a comparison between the microstructure of the three tested foams. The perforations in the cells of EML foams are generally classified by their size in two major categories; namely small and large perforations. While the latter is attributed to the intersection between two adjacent cells and commonly observed in the upper portion of the cell, the former is a byproduct of the manufacturing process. Polyurea microspheres are formed during the mixing process by precipitation polymerization, where these microspheres are then attracted by gravity and suction forces during the draining of diH2O. By settling at the bottom, the microspheres nucleate new CO2 gas bubbles that create these small perforations.

Figure 23:
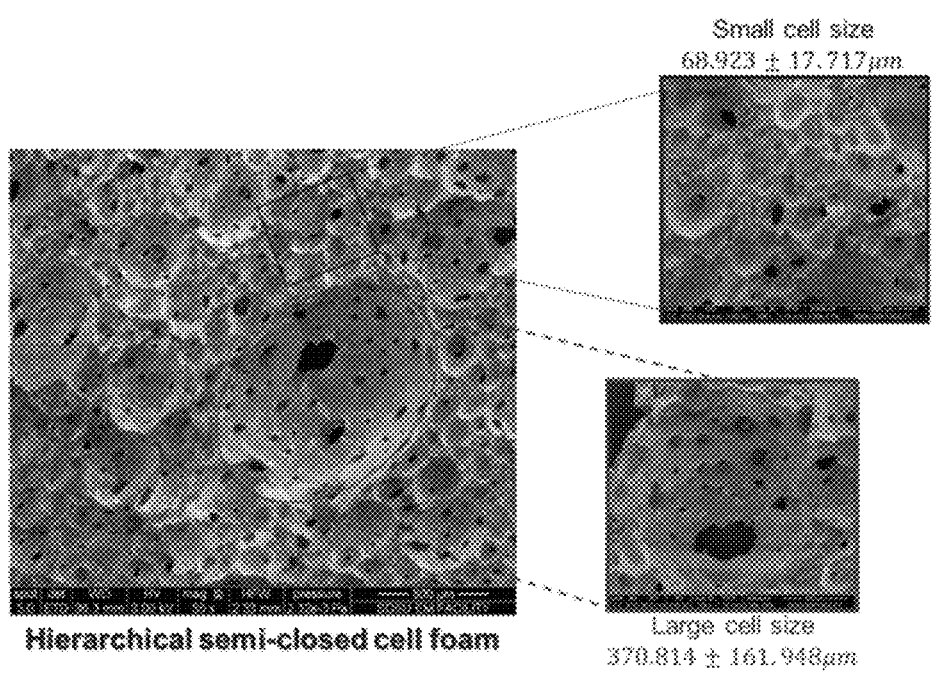
FIG. 23 is an illustration of SEM micrographs of 0.21 relative density polyurea foam showing the hierarchical microstructure.

Finally, a close-up examination of the micrographs shown in FIG. 22 revealed a hierarchical microstructure in the lighter polyurea foams, where large semi-closed cells with a size of 370±162 μm are surrounded by a relatively smaller cell sizes of 69±162 μm. This observation is clearly shown in the SEM micrographs presented in FIG. 23. In all, the hierarchical structure necessitates further investigation that is beyond the scope discussed herein.

Example—Experimental Protocol

All foam samples were tested using an Instron® 5843 Universal Load Frame instrumented with a ±1 kN load cell at a strain-rate of approximately 0.05 s−1. At the onset of each measurement run, samples were placed under a preload pressure of 140 Pa to ensure proper contact. A conditioning cycle was then performed twice at a cross-head speed of 250 mm/min to 70% engineering strain, followed by a 6-minute (±1 min) recovery period. Thereafter, the samples were compressed at a cross-head speed of 50 mm/min to 70% engineering strain. Following the experimental testing, the engineering stress-strain data for each of the three types of foam materials was averaged and the deviation within each data set was found to be below 3%. Thereafter, the average stress-strain data was further analyzed to report the apparent modulus, the area under the elastic region, and the area under the entire stress-strain curve. In addition to the quasi-static analysis, predictions of the dynamic behavior of the foams were performed following the methods.

Specifically, two dynamic properties are calculated from the stress-strain data to elucidate the performance of the foams under dynamic loading, namely the G-level and Efficiency. First, the maximum deceleration, or maximum G-level, is defined as the ratio between the acceleration of the drop mass and the acceleration due to gravity, which can also be calculated using the energy per unit volume obtained from the integral of the stress-strain curve, expressed as $$G_m = \frac{\sigma_m}{\int_0^{\varepsilon_m} \sigma d\varepsilon} \frac{H}{h}$$

Where $\sigma_m$ and $\varepsilon_m$ are the maximum stress and strain values produced by the impact (respectively), H is the height from which the mass is dropped, and h is the thickness of the foam sample. Second, the efficiency of the energy absorbed by the foam during a dynamic impact, which is defined herein based on the comparison of real and ideal foams. While the behavior of real foam mimics those shown later in FIG. 3, an ideal foam, however, can be described as a foam that displays a constant stress value throughout the entirety of its compression history. Thus, the efficiency of energy absorption is the ratio of energy absorbed by a real foam compressed to the maximum strain produced by the loading event to the energy absorbed by an ideal foam compressed throughout its thickness as shown in Equation 7.

$$E = \frac{\int_0^{\varepsilon_m} \sigma d\varepsilon}{\sigma_m}$$

The G-level and Efficiency as defined in Equations 6 and 7 are good estimators of the performance of foam in response to dynamic loading, but the quasi-static derived data may overestimate the overall dynamic behavior of foams.

Example—Energy (Dissipated) Under Stress-Strain Curve

Figure 24:
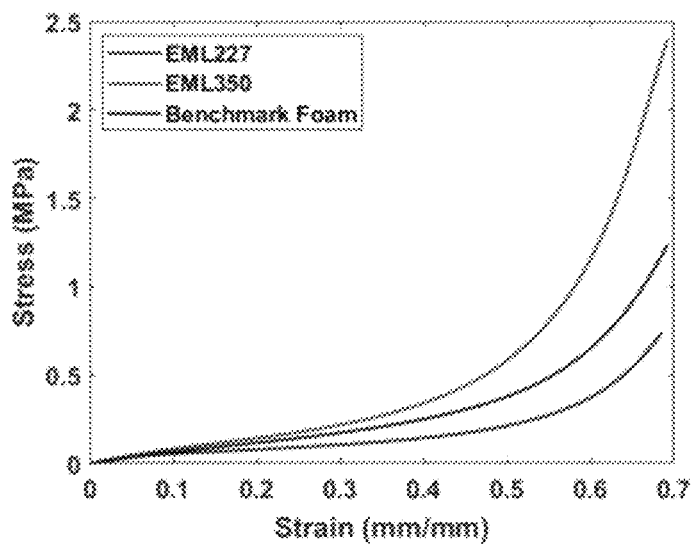
FIG. 24 is an illustration of Stress-strain data collected from polyurea foams with 0.21 (EML227) and 0.31 (EML350) relative density in comparison to a benchmark foam (0.397 kg/m3).

FIG. 24 shows the average compressive stress-strain behavior of EML227, EML350, and the benchmark foams when tested at a quasi-static strain-rate of approximately 0.05 s−1. The average was calculated based on testing 25 samples of EML227, 3 samples of EML350, and 5 samples of the benchmark foam. While at low strain levels, the response of all three foams is nearly identical.

However, each foam variation exhibits a significantly different response at higher strains. The deviation in the responses starts around 15% strain, where the semi-closed cell structure of the EML foams gives rise to an interplay between the deformation due to the entrapment of gas within the cells and cell-face stretching associated with closed-cells, as well as cell-wall buckling, a hallmark of open-cell foams. In the absolute sense, EML350 foam was found to outperform both EML227 and benchmark foams. Interestingly, the energy under the stress-strain curve of EML227 (536 Pa/kg/m3) and benchmark foam (532 Pa/kg/m3) are within the experimental error of each other, thus elucidating the superiority of EML 227 foam on per unit mass basis in attenuating impacts, since it is merely half the weight. On the other hand, when comparing EML350 with the benchmark foam, the former was found to store (991 Pa/kg/m3), nearly double the energy under the stress-strain curve while being 12% lighter.

In the elastic region, the apparent modulus for EML227 was found to be 0.64±0.11 MPa, while for EML350 it was found to be 0.88±0.16 MPa, and for the closed-cell benchmark foam it was reported to be 0.69±0.03 MPa. Using Equations 1 and 2 to predict the elastic modulus of the newly synthesized foams yielded an overestimation of ~1.3 MPa for EML227 and ~1.7 MPa for EML350 by assuming either open-cell or closed-cell structures, which corresponds to an error of roughly 100% when compared with the experimental results. Thus, neither EML227 nor EML350 can be classified as purely open-cell or closed-cell foam.

FIG. 22 shows perforations in the microstructure that are ubiquitously present in all the cells, hence eliminating the rationale for the classification of separated partially-open/partially-closed cells. Therefore, the newly synthesized foams are classified as semi-closed cell, in which the cells are predominantly closed except for a few regions at the bottom of the cells, where a high density of small perforations are present as discussed earlier. In our effort to reconcile the difference between experimental data and theoretical predictions (using Equations 1 and 2) to better calculate the properties of our foam, the new foam structure was modeled as two elastic springs in series, where the top portion of the foam cell is represented by a closed-cell spring (Equation 2) and the bottom highly-perforated section of the cell is modeled as an open-cell elastic spring (Equation 1). Hence, the effective modulus of semi-closed cell foams can be written as Eq. 8

$$\frac{E^*_{eq}}{E_s} = \frac{C_1^2 \Phi^2 \left(\frac{\rho^*}{\rho_s}\right)^2 + C_1 C_2 (1-\Phi) \left(\frac{\rho^*}{\rho_s}\right)^2 + C_1 \frac{p_o(1-2v^*)\left(\frac{\rho^*}{\rho_s}\right)}{E_s\left(1-\frac{\rho^*}{\rho_s}\right)}}{C_1 \left(\frac{\rho^*}{\rho_s}\right)(1-\Phi^2) + C_2(1-\Phi) + \frac{p_o(1-2v^*)}{E_s\left(1-\frac{\rho^*}{\rho_s}\right)\left(\frac{\rho^*}{\rho_s}\right)}}$$

Using Equation 8 with Es=90.15 MPa, ϱ s=1,073 MPa, Φ=1, po=101.325 kPa, v*=0.33, and C1=0.311 for EML227 and C1=0.181 for EML350, the elastic moduli of EML227 and EML350 were accurately predicted with an error within ±1%. Furthermore, the areas under the stress-strain curve in the elastic region, bounded below 6.8% strain for EML227 and 7.8% strain for EML350, corresponding to the elastic limits, were found to be predicted with good agreement with the experimental results when the elastic moduli are based on Equation 8. On the contrary, the scaling laws of either open-cell or closed-cell result in an error of over 50%, which further validate the inventive model and confirm the semi-closed cell structure of the foam. In the plateau region, all tested foams show an increase in the stress corresponding to a large increase in the strain, which as discussed earlier is a distinct characteristic of closed-cell foams. That is to say, the closed-cell behavior is dominating the response of specifically polyurea foams from the outset of the elastic region to the onset of the densification region. Nonetheless, and regardless of the base material, all tested foams have nearly the same onset of densification at ~42% strain, by carefully identifying the inflection point on the stress-strain curve rather than neglecting the plateau region for foams with relative densities higher than 0.3 (see Equation 5).

Considering the plateau region, which is important for impact mitigation applications, allowed us to compute the effectiveness of the tested foams in dissipating the incoming impact energy through the area under the stress-strain curve corresponding to this region. Thus, EML350 encloses the largest area under the stress-strain curve in the plateau region with ~71.7 kJ/m3, which compares to merely half the energy of 32.3 kJ/m3 for EML 227 foam. Furthermore, the energy encompassed by the stress-strain data in the plateau region for the benchmark foam lies between the new polyurea foams at 51.9 kJ/m3, demonstrating the superiority of our novel foam based on energy dissipated per unit mass.

Example—Efficiency and G-Level

Figure 25:
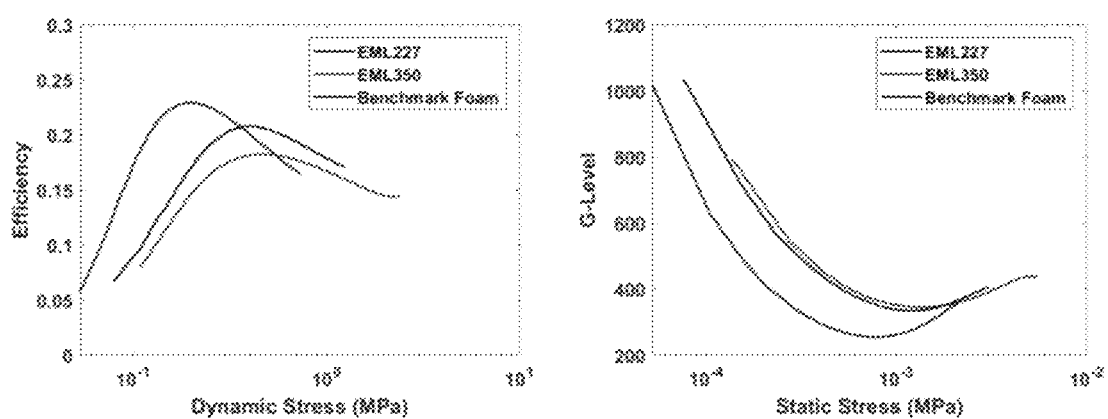
FIG. 25 is an illustration of Comparison of the efficiency and G-level between novel polyurea foam and closed-cell benchmark foam.

FIG. 25 shows the predicted performance of polyurea foams in comparison to a benchmark closed-cell foam based on efficiency and G-level in dynamic loading scenarios calculated from the quasi-statically measured stress-strain curve as discussed earlier. In essence, the quasi-static data is used to make predictions about the performance of these foams in high impact loading scenarios.

FIG. 25 reports four important predictions to explicate the superiority of our novel foams.

First, regardless of the evaluation metric, EML227 outperforms the other two types of tested foams, where the maximum efficiency and minimum G-level were found to be 23%, and 254, respectively. These levels are 22% and 36% higher than those reported for the denser polyurea foam counterpart, respectively.

Second, the peak of the maximum efficiency associated with EML227 occurs at a lower dynamic stress than those for EML350 and benchmark foams, which indicates that while EML227 is suitable for low impact applications, the others should be considered for applications when higher dynamic stresses are forecasted. Basically, using the same manufacturing process and the same base materials, FIG. 25 shows the ability to tailor the foam properties for a specific application depending on the range of expected dynamic stresses.

Third, the predictions of the maximum efficiency and minimum G-Level are ranked based on the amplitudes such that the performance of the benchmark foam is always shown to lie between the performance of the polyurea foams. Interestingly, the same ranking was observed as shown in FIG. 24 and discussed earlier in relation to the onset of densification at a strain of ~42%. In other words, the effectiveness of a foam material in an impact mitigation scenario is hinged on its mechanical response prior to the onset of densification.

Finally, the ability of EML227 to decelerate an incoming impact mass was shown to be superior in comparison to the other two tested foams, which is shown by having a minimum G-Level that is 36% and 31% lower than both EML350 and the benchmark foams, respectively.

The effectiveness of EML227 foam to reduce the severity of the impact is thought to be associated with the underlying semi-closed cell microstructure. The latter point is further elucidated by comparing the G-Level of EML350 to a 12% heavier completely closed-cell benchmark foam, which shows a comparable effectiveness in mitigating impacts while maintaining a lower weight penalty.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

Having described embodiments for the invention herein, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed:

1. A process of making a hybrid polyurea foam having a semi-closed cell microstructure, comprising
   1) mixing deionized water and an amine compound in a mixing container with a mixer;
   2) with the mixer turned off, adding an isocyanate compound to the mixing container to form an initial solution and then mixing the solution to form a foamed solution, wherein the mass ratio of amine compound to isocyanate compound in the initial solution is 4:1 and the mass ratio of amine compound and isocyanate compound to deionized water in the initial solution is 8:3; and,
   3) letting the foamed solution sit after mixing to allow time for reaction of the isocyanate compound, deionized water, and the amine compound to occur, and then, draining excess deionized water from the mixing container and pouring the foamed solution into a mold.

2. The process of claim 1 wherein the isocyanate compound has the formula $$OCN-R_1-NCO,$$

where $R_1$ is a substituted or unsubstituted alkyl or aryl group having 3-10 carbons; and the amine compound has the formula $$H_2N-R_2-NH_2$$

where $R_2$ is a substituted or unsubstituted alkyl or aryl group having 3-10 carbons.

3. The process of making a hybrid polyurea foam of claim 1, wherein the hybrid polyurea foam is configured in a complex geometry or shape selected from the group consisting of: padding foam for helmets, outsoles for walking shoes, outsoles for running shoes, and padding foam for body armor.

4. The process of claim 1, wherein the isocyanate compound is selected from the group consisting of an aromatic diisocyanate, toluene diisocyanate (TDI), methylenediphenyl diisocyanate (MDI), p-phenylene diisocyanate (PPDI), naphthalene diisocyanate (NDI), an aliphatic diisocyanate, hexamethylene diisocyanate (HDI), methylene dicyclohexyl diisocyanate (HMDI), isophorone diisocyanate (IPDI), and mixtures thereof.

5. The process of claim 1 wherein the amine compound is polytetramethyleneoxide-di-p-aminobenzoate.

6. A hybrid polyurea foam made according to the process of claim 1, wherein the hybrid polyurea foam comprises: (i) a plurality of large semi-closed cells having an average diameter of 200-500 µm, surrounded by (ii) a plurality of small semi-closed cells having an average diameter of 30-90 µm.

7. A process of making a hybrid polyurea foam having a semi-closed cell microstructure, comprising
   1) removing crystallization in a sample of methylene diphenyl diisocyanate by heating the methylene diphenyl diisocyanate to about 98 degrees Fahrenheit and holding at 98 degrees Fahrenheit for about 45 minutes, then immediately stirring vigorously for 2 minutes, and allowing the methylene diphenyl diisocyanate to return to room temperature;
   2) mixing a sample of deionized water and a sample of polytetramethyleneoxide-di-p-aminobenzoate with a mixer in a mixing container for about 45 seconds at about 10,000 rpm;
   3) with the mixer turned off and suspended above the mixing container, adding the methylene diphenyl diisocyanate to the mixing container to form a solution and then mixing the solution for 45 seconds at roughly 10,000 RPM while moving the mixer around the mixing container during mixing; and wherein the mass ratio of polytetramethyleneoxide-di-p-aminobenzoate to methylene diphenyl diisocyanate in the solution is 4:1 and the mass ratio of polytetramethyleneoxide-di-p-aminobenzoate and methylene diphenyl diisocyanate to deionized water in the solution is 8:3; and,
   4) letting the solution sit for 45 seconds after mixing, allowing time for reaction of the methylene diphenyl diisocyanate, deionized water, and polytetramethyleneoxide-di-p-aminobenzoate to occur, and then, after draining excess deionized water from the mixing container, pouring the solution into a mold.

8. A hybrid polyurea foam made according to the process of claim 7, wherein the hybrid polyurea foam comprises: (i) a plurality of large semi-closed cells having an average diameter of 370+/−162 µm, surrounded by (ii) a plurality of small semi-closed cells having an average diameter of 69+/−162 µm.

9. The hybrid polyurea foam of claim 8, wherein the hybrid polyurea foam is configured in a complex geometry or shape selected from the group consisting of: padding foam for helmets, outsoles for walking shoes, outsoles for running shoes, and padding foam for body armor.

10. A method of preparing a polyurea component in a pre-treated non-stick mold, comprising the following steps in order:
   1) measuring out 429.9 g polytetramethyleneoxide-di-p-aminobenzoate, 107.5 g methylene diphenyl diisocyanate, and 1,433.0 g deionized water;
   2) heating the methylene diphenyl diisocyanate to 98 degrees Fahrenheit and holding at 98 degrees Fahrenheit for 45 minutes, immediately followed by stirring vigorously for 2 minutes and then allowing the methylene diphenyl diisocyanate to return to room temperature, thereby breaking up any crystallization in the methylene diphenyl diisocyanate;
   3) adding the deionized water and then the polytetramethyleneoxide-di-p-aminobenzoate to a mixing container to form a first solution, followed by using a homogenizer to mix the first solution for 45 seconds at roughly 10,000 RPM while moving the homogenizer around the mixing container;
   4) with the homogenizer turned off and suspended above the mixing container, adding the methylene diphenyl diisocyanate to the mixing container to form a second solution, using the homogenizer to mix the second solution for 45 seconds at 10,000 RPM while moving the homogenizer around the mixing container;
   5) letting the second solution sit for a 45 second waiting period seconds after mixing allowing time for reaction of the methylene diphenyl diisocyanate, deionized water, and polytetramethyleneoxide-di-p-aminobenzoate to occur;
   6) immediately after the waiting period, draining excess deionized water from the bottom of the mixing container;
   7) evenly pouring the second solution into a mold having four sides;
   8) draining excess deionized water by tilting the mold in multiple directions;
   9) placing a mold lid on the mold, and attaching a bar clamp to each of four sides of the mold to limit expansion of the second solution as it foams and inhibit the mold lid from rising or becoming uneven; and
   10) leaving the foam in the mold for 24 hours and then removing the mold from a polyurea component which is foamed.

11. A polyurea component prepared according to the process of claim 10, wherein the polyurea component is configured in a complex geometry or shape selected from the group consisting of: padding foam for helmets, outsoles for walking shoes, outsoles for running shoes, and padding foam for body armor.

* * * * *